US012747129B2

(12) United States Patent
Debora et al.

(10) Patent No.: US 12,747,129 B2

(45) Date of Patent: Sep. 29, 2026

(54) SERIES ENABLED MULTI-MATERIAL EXTRUSION TECHNOLOGY

(71) Applicant: Mosaic Manufacturing Ltd., Toronto (CA)

(72) Inventors: Mitchell Oliver Debora, Thornhill (CA); Daniel Lloyd, Calgary (CA); Derek Alan Vogt, Calgary (CA)

(73) Assignee: Mosaic Manufacturing Ltd., Toronto (CA)

( * ) Notice: Subject to any disclaimer, the term of this patent is extended or adjusted under 35 U.S.C. 154(b) by 66 days.

(21) Appl. No.: 18/972,294

(22) Filed: Dec. 6, 2024

(65) Prior Publication Data

US 2025/0100842 A1 Mar. 27, 2025

Related U.S. Application Data

(62) Division of application No. 18/325,801, filed on May 30, 2023, now Pat. No. 12,202,700, which is a (Continued)

(51) Int. Cl.

*B65H 57/12* (2006.01)

*B22F 10/18* (2021.01)

(Continued)

(52) U.S. Cl.

CPC ............ *B65H 57/12* (2013.01); *B22F 10/18* (2021.01); *B22F 12/57* (2021.01); *B22F 12/58* (2021.01);

(Continued)

(58) Field of Classification Search

CPC ... B29C 64/118; B29C 64/209; B29C 64/336; B33Y 30/00; B33Y 40/00; B33Y 50/02

See application file for complete search history.

(56) References Cited

U.S. PATENT DOCUMENTS

| | | | |
|---|---|---|---|
| 3,558,411 | A | 1/1971 | Beelien |
| 3,643,417 | A | 2/1972 | Irwin |

(Continued)

FOREIGN PATENT DOCUMENTS

| | | | |
|---|---|---|---|
| EP | 3071396 | A1 | 9/2016 |
| EP | 3107714 | A1 | 12/2016 |

(Continued)

OTHER PUBLICATIONS

3D Filament Splicer by Artesea, MakerBot Thingiverse, Apr. 15, 2014, http://www.thingiverse.com/thing:281792, accessed on Oct. 27, 2015, 1 page.

(Continued)

*Primary Examiner* — Yunju Kim

(74) *Attorney, Agent, or Firm* — Hamilton, Brook, Smith & Reynolds, P.C.

(57) ABSTRACT

A method and apparatus are provided for producing a multicomponent feedstock being delivered through a print head of a 3D printer. Multiple component lengths are produced from separate feedstocks and are aligned to form the multicomponent feedstock which is fed into the print head for extrusion. The method includes providing at least two sources of feedstock of different material, feeding a distal end of a first feedstock along a feed path, cutting the first feedstock at a pre-determined length to provide a length of first feedstock having a proximal end. The method includes feeding a distal end of a second feedstock along the feed path and aligning the distal end of the second feedstock with the proximal end of the length of the first feedstock. The second feedstock is cut at a pre-determined length to provide a length of the second feedstock serially aligned with the length of first feedstock, to form a length of multicomponent feedstock. The length of multicomponent feedstock is fed into the print head.

25 Claims, 19 Drawing Sheets

Related U.S. Application Data division of application No. 17/100,576, filed on Nov. 20, 2020, now Pat. No. 11,702,312, which is a division of application No. 14/831,396, filed on Aug. 20, 2015, now Pat. No. 10,870,268.

(60) Provisional application No. 62/147,393, filed on Apr. 14, 2015, provisional application No. 62/040,045, filed on Aug. 21, 2014.

(51) Int. Cl.

| | |
|---|---|
| ***B22F 12/57*** | (2021.01) |
| ***B22F 12/58*** | (2021.01) |
| ***B22F 12/90*** | (2021.01) |
| ***B29C 64/118*** | (2017.01) |
| ***B29C 64/209*** | (2017.01) |
| ***B29C 64/336*** | (2017.01) |
| ***B33Y 30/00*** | (2015.01) |
| ***B33Y 40/00*** | (2020.01) |
| ***B33Y 40/10*** | (2020.01) |
| ***B65H 57/14*** | (2006.01) |

(52) U.S. Cl.

CPC ............ *B22F 12/90* (2021.01); *B29C 64/118* (2017.08); *B29C 64/209* (2017.08); *B29C 64/336* (2017.08); *B33Y 30/00* (2014.12); *B33Y 40/00* (2014.12); *B33Y 40/10* (2020.01); *B65H 57/14* (2013.01)

(56) References Cited

U.S. PATENT DOCUMENTS

| | | | |
|---|---|---|---|
| 3,919,037 | A | 11/1975 | Miller |
| 4,032,382 | A | 6/1977 | Obeda |
| 4,274,707 | A | 6/1981 | Pacey et al. |
| 4,461,416 | A | 7/1984 | Cheh |
| 4,958,905 | A | 9/1990 | Tynes et al. |
| 5,121,329 | A | 6/1992 | Crump |
| 6,004,124 | A | 12/1999 | Swanson et al. |
| 6,129,872 | A | 10/2000 | Jang |
| 6,401,002 | B1 | 6/2002 | Jang et al. |
| 6,569,373 | B2 | 5/2003 | Napadensky |
| 6,685,866 | B2 | 2/2004 | Swanson et al. |
| 6,782,303 | B1 | 8/2004 | Fong |
| 6,790,403 | B1 | 9/2004 | Priedeman et al. |
| 6,923,634 | B2 | 8/2005 | Swanson et al. |
| 7,163,655 | B2 | 1/2007 | Weber et al. |
| 7,169,337 | B2 | 1/2007 | Swanson et al. |
| 7,172,715 | B2 | 2/2007 | Swanson et al. |
| 7,395,952 | B2 | 7/2008 | Daniel et al. |
| 7,604,470 | B2 | 10/2009 | Labossiere et al. |
| 7,891,964 | B2 | 2/2011 | Skubic et al. |
| 7,938,351 | B2 | 5/2011 | Taatjes et al. |
| 8,330,081 | B2 | 12/2012 | Dimmick et al. |
| 8,349,239 | B2 | 1/2013 | Hopkins et al. |
| 8,827,684 | B1 | 9/2014 | Schumacher et al. |
| 10,870,268 | B2 | 12/2020 | Debora et al. |
| 11,702,312 | B2 | 7/2023 | Debora et al. |
| 12,202,700 | B2 | 1/2025 | Debora et al. |
| 2003/0011103 | A1 | 1/2003 | Swanson et al. |
| 2003/0236588 | A1 | 12/2003 | Jang et al. |
| 2004/0118099 | A1 | 6/2004 | Zewde et al. |
| 2008/0213419 | A1 | 9/2008 | Skubic et al. |
| 2009/0174134 | A1 | 7/2009 | Wong et al. |
| 2010/0208016 | A1 | 8/2010 | Menchik et al. |
| 2010/0327479 | A1 | 12/2010 | Zinniel et al. |
| 2011/0076496 | A1 | 3/2011 | Batchelder et al. |
| 2011/0172611 | A1 | 7/2011 | Yoo et al. |
| 2013/0209600 | A1 | 8/2013 | Tow |
| 2013/0328228 | A1 | 12/2013 | Pettis et al. |
| 2014/0034214 | A1 | 2/2014 | Boyer et al. |
| 2014/0070461 | A1 | 3/2014 | Pax |
| 2014/0134334 | A1 | 5/2014 | Pridoehl et al. |
| 2014/0134335 | A1 | 5/2014 | Pridoehl et al. |
| 2014/0159273 | A1 | 6/2014 | Koop et al. |
| 2014/0271328 | A1 | 9/2014 | Burris et al. |
| 2014/0328963 | A1 | 11/2014 | Mark et al. |
| 2015/0056317 | A1 | 2/2015 | Chen |
| 2015/0093465 | A1 | 4/2015 | Page |
| 2015/0158244 | A1 | 6/2015 | Tibbits et al. |
| 2015/0165677 | A1 | 6/2015 | Ho et al. |
| 2015/0231829 | A1 | 8/2015 | Haider et al. |
| 2015/0266235 | A1 | 9/2015 | Page |
| 2015/0378654 | A1 | 12/2015 | Asai |
| 2016/0052208 | A1 | 2/2016 | Debora et al. |
| 2016/0339633 | A1 | 11/2016 | Stolyarov et al. |
| 2017/0225392 | A1 | 8/2017 | Beak et al. |
| 2018/0043628 | A1 | 2/2018 | Nadeau et al. |
| 2018/0117831 | A1 | 5/2018 | Haider et al. |
| 2018/0207869 | A1 | 7/2018 | Lee et al. |
| 2018/0250748 | A1 | 9/2018 | Page |
| 2019/0127176 | A1 | 5/2019 | Franklin-Hensler et al. |
| 2021/0070031 | A1 | 3/2021 | Debora et al. |
| 2023/0303360 | A1 | 9/2023 | Debora et al. |
| 2025/0145403 | A1 | 5/2025 | Debora et al. |

FOREIGN PATENT DOCUMENTS

| | | | |
|---|---|---|---|
| KR | 10-1645250 | B1 | 8/2016 |
| WO | 97/37810 | A1 | 10/1997 |
| WO | 2011/005492 | A1 | 1/2011 |
| WO | 2014/039825 | A2 | 3/2014 |
| WO | 2014/149312 | A1 | 9/2014 |
| WO | 2015/077262 | A1 | 5/2015 |
| WO | 2015/120538 | A1 | 8/2015 |
| WO | 2015/156877 | A2 | 10/2015 |
| WO | 2016/026045 | A1 | 2/2016 |

OTHER PUBLICATIONS

3D Printer Filament Welder, MyMFGco, http://www.mymfgco.com/?page_id=46, accessed on Oct. 27, 2015, 4 pages.
Adam Fabio, "A Quick and Simple Filament Joiner for Multi-Color Prints", Hackaday, Jan. 20, 2014, http://hackaday.com/2014/01/20/a-quick-and-simple-filament-joiner-for-multi-color-prints/, accessed Oct. 27, 2015, 7 pages.
Christopher Olah, image from blog post about splicing ABS, at least as early as Dec. 10, 2010, 1 page.
Corrected Version of the CIPO Examination Notes, dated Jan. 29, 2016, for International Application No. PCT/CA2015/050792, entitled "Series Enabled Multi-Material Extrusion Technology,", total pp. 3.
Corrected Version of the International Search Report (ISR) of the International Searching Authority, dated Jan. 29, 2016, for International Application No. PCT/CA2015/050792, entitled "Series Enabled Multi-Material Extrusion Technology,", total pp. 13.
Corrected Version of the Written Opinion (WO) of the International Searching Authority, dated Jan. 29, 2016, for International Application No. PCT/CA2015/050792, entitled "Series Enabled Multi-Material Extrusion Technology," total pp. 7.
Davide Sher, "Giving Any FFF 3D Printer a Multicolor, Multimaterial 3D Printing Palette," 3D Printing Industry, Apr. 21, 2015, http://3dprintingindustry.com/2015/04/2I/tum-3d-prints-multicolor-miro-masterpieces-pal . . . , accessed on Aug. 24, 2015, 4 pages.
European Examination Report for European Application No. EP 15 83 3 974.7, titled: Series Enabled Multi-Material Extrusion Technology, Dated: Jul. 28, 2020.
Extruder System for 3D Printer, Cubify 3D Printer, 3D Systems, at least as early as Feb. 22, 2014, 1 page.
Filament joiner for multi-colour printed objects, Richard Home, AKA RichRap, at least as early as Jul. 5, 2011, 1 page.
Filament joiner for multicoloured printed 3D object by RichRap—MakerBot Thingiverse, Jul. 5, 2011, http://www.thingiverse.com/thing:9850, accessed Oct. 27, 2015, 1 page.
Filament Joiner, Adam Fabio, at least as early as Jan. 20, 2014, 1 page.
Filament system for 3D printer, Xeed, Leapfrog, at least as early as Aug. 12, 2015, 1 page.

(56) References Cited

OTHER PUBLICATIONS

Filastruder, Filastruder Kit, http://www.filastruder.com/products/fdastruder-kit, accessed on Aug. 15, 2015, 4 pages.
Fuse, fuseshop, http://fuseclamp.com/en/, accessed on Oct. 27, 2015, 2 pages.
FuseClamp, Fuse, at least as early as Jul. 2, 2014, 1 page.
Fused ABS Filament, Christopher Olah's Blog, Dec. 10, 2010, https://christopherolah.wordpress.com/2010/12/10/fused-abs-filament/, accessed on Oct. 27, 2015, 2 pages.
Hycospeed, "What Ever Became of . . . 4 Color Pens?" Atomic Toasters, Jul. 28, 2012, http://atomictoasters.com/2012/07/what-ever-became-of-4-color-pens/, accessed on Aug. 24, 2015, 4 pages.
International Preliminary Report on Patentability and Annexes, dated: Dec. 12, 2016, for International Application PCT/CA 2015/050792, "Series Enabled Multi-Material Extrusion Technology", total pp. 40.
International Search Report, PCT/US15/11878, "Fused Filament Fabrication Using Multi-Segment Filament," dated Nov. 30, 2015.
Invitation to Pay Additional Fees received for PCT Patent Application No. PCT/CA2015/050792, mailed on Oct. 19, 2015, 2 pages.
Krassenstein, B., Mosaic Manufacturing Reveals Incredible Multi-Colored 3D Printing from a Single Extruder [Online], Nov. 14, 2014, [retrieved Nov. 25, 2015], retrieved from the internet http://3dprint.com/24581/mosaic-manufactuiring-color-3d/>, 3 pages.
Leapfrog 3D Printers, Xeed-Printers—Products, http://www.lpfrg.com/leapfrog-xeed, accessed on Oct. 27, 2015, 7 pages.
Manual hand fusing and trimming with lighter and pliers, screenshot of video posted Mar. 11, 2012, 1 page.
Michael Molitch-Hou, "Pending Patent Colors FFF 3D Printing with Bold New Techniques," Full-Color 3D Printing Patent, 3D Printing Industry, May 4, 2015, accessed on Oct. 30, 2015, 7 pages.
Notification of Transmittal of the International Search Report (ISR) and the Written Opinion (WO) of the International Searching Authority, or the Declaration with copies of the ISR and WO, entitled "Series Enabled Multi-Material Extrusion Technology," for International Application No. PCT/CA2015/050792, mailed Dec. 4, 2015, 16 pages.
Reprap Prusa Simple Filament Splicing, posted by HossMachine, Mar. 11, 2012, https://www.youtube.com/watch?v=YsGsLG-XRR8, accessed on Oct. 27, 2015, 2 pages.
Richard Horne, AKA RichRap, screenshot of video posted Aug. 16, 2011, 1 page.
Richard Horne, Rainbow_REPRAP_filament_test.wmv, YouTube video, Aug. 16, 2011, https://www.youtube.com/watch?v=UA97cC1QfM8, accessed on Oct. 27, 2015, 2 pages.
Spectrom—Full Color Desktop 3D Printer, http://spectrom3d.com/, accessed on Aug. 24, 2015, 4 pages.
Splicer/Former for PLA filament by Malcolm, MakerBot Thingiverse, Dec. 9, 2011, http://www.thingiverse.com/thing:14438, accessed on Oct. 27, 2015, 1 page.
Stephanie Mlot, "3D Print Multi-Colored Creations With Palette", News & Opinion/PCMag.com, Apr. 22, 2015, http://www.pcmag.com/article2/0,2817,2482360,00.asp, accessed on Jul. 27, 2015, 4 pages.
U.S. Appl. No. 15/112,098, "Fused Filament Fabrication Using Multi-Segment Filament," filed Jul. 15, 2016.
U.S. Appl. No. 61/928,573, "Fused Filament Fabrication with Multi-Material Filament," filed Jan. 17, 2014.

DISCONTINUITY 456 POSITIONED BEFORE SPLICER 162

↓

SPLICER 162 CLOSES

↓

FEEDSTOCK ADVANCES

↓

DISCONTINUITY HELD IN SPLICER 162

↓

COMPRESSION

↓

DECOMPRESSION

↓

MOVE BACK AND FORTH

↓

SPLICER 162 OPENS

↓

DISCONTINUITY ADVANCES INTO FQMM 164

SERIES ENABLED MULTI-MATERIAL EXTRUSION TECHNOLOGY

RELATED APPLICATIONS

This application is a divisional of U.S. application Ser. No. 18/325,801, filed on May 30, 2023, which is a divisional of U.S. application Ser. No. 17/100,576, filed on Nov. 20, 2020, issued as U.S. Pat. No. 11,702,312 on Jul. 18, 2023, which is a divisional of U.S. application Ser. No. 14/831,396, filed on Aug. 20, 2015, issued as U.S. Pat. No. 10,870,268 on Dec. 22, 2020, which claims the benefit of U.S. Provisional Application No. 62/147,393, filed on Apr. 14, 2015, and claims the benefit of U.S. Provisional Application No. 62/040,045, filed on Aug. 21, 2014.

The entire teachings of the above applications are incorporated herein by reference.

BACKGROUND

Extrusion is a process of passing material through a form or die that imposes a change on the material. Large volume extruders are used in manufacturing processes such as injection molding, while small scale extruders are commonly used in fused deposition modeling three dimensional printers (also referred to herein as 3D printers) amongst many other applications. Conventionally, extruders process/output a single material but if a second material is required, it is common to introduce a second extruder. An example of this is when toothbrush handles are injection molded with two extruders where one fills a part of the mold for the handle substrate with a firm plastic and the other fills a part of the mold with an elastomeric material for the handle grip. In fused deposition modeling 3D printing, the equivalent may be to introduce multiple extruders onto the printer where each extruder processes a distinct build material (feedstock).

This is a 'parallel' feed approach to achieve multi-material outputs from extruders such that a separate extruder is required for each new material. For the purpose of this disclosure, the term new material refers to a substance that may differ in chemical composition, any properties including, but not limited to, color, physical appearance, strength, conductance, geometry, and size, or may be identical (as, for example, in the case where a first supply of feedstock has been exhausted and a new supply needs to be employed) to the prior material being considered.

Focusing on fused deposition modeling 3D printing, there are currently several known approaches to achieve multi-material printed parts. The parallel feed solution in fused deposition modeling 3D printing is to introduce additional extruders to the 3D printer as noted above. By doing so, the printer can alternate between these extruders where each contain a different build material thus allowing for a printed part to be fabricated using multiple build materials. It is important to note that although the feeds enter in parallel, only one is typically used at a time and thus the overall printing process is still serial in nature.

There are many issues with parallel feed technology that someone skilled in the art may recognize including but not limited to: a reduction in print speed and build volume compared to a single extruder, poor quality transitions between regions with different materials, and limited number of maximum build materials. The reduction in speed is due to the fact that each additional extruder unit/feed adds mass to the print head and in turn reduces the speed at which it can operate. The reduction in print volume is due to the fact that each additional extruder unit/feed requires a nozzle which makes the printing head larger and limits its travel. The poor quality transitions are due to a phenomenon known in the industry as 'oozing' which is when build material exits/leaks from the extruder nozzle in an uncontrolled manner. This is common for multiple extruders because while one extruder is actively being used to manufacture the printed parts, the others are not being used and the build materials inside can leak out. This uncontrolled oozing may adhere to the printed parts in undesirable locations resulting in poor quality printed parts. Finally, because each build material requires a dedicated print nozzle, weight, volume, and economical constraints limit the maximum number of build materials it is practical to have on the fused deposition modeling 3D printer.

It would therefore be useful to provide a method and apparatus for 3D printing which avoids the need for multiple extruders.

SUMMARY

The present disclosure relates to a series enabled multi-material extrusion technology for use in, but not limited to, fused deposition modeling three dimensional printers.

The present disclosure provides an alternative to the parallel feed approach where a series feed approach is taken. The series feed refers to the fact that multiple materials enter the extruder in series rather than in parallel or to separate parallel extruders. This provides a method of series enabled multi-material extrusion (hereinafter abbreviated to SEME). The terms "multi-material" and "multicomponent" are used interchangeably.

According to a first aspect, the invention provides a method of automatically forming and feeding a multicomponent feedstock being delivered through a print head of a 3D printer, the method including, under processor control concurrent with and in cooperation with control of a printer tool path: at a multicomponent feedstock source coupled to but spaced from the print head by a feedstock feed path, automatically positioning a portion of a first feedstock along the feed path; automatically positioning a portion of a second feedstock along the feed path and in line with the portion of the first feedstock, the portions of feedstock being aligned in series to form the multicomponent feedstock; and feeding the multicomponent feedstock along the feed path to the print head.

In some embodiments, the first feedstock and the second feedstock may be spooled feedstock in the form of filament.

In some embodiments, positioning the portion of the first feedstock may include: feeding a distal end of the first feedstock along the feed path toward the print head; and cutting the first feedstock at a pre-determined length to provide a length of the first feedstock having a proximal end and the distal end. In some embodiments, positioning the portion of the second feedstock may include: feeding a distal end of the second feedstock along the feed path; aligning and abutting the distal end of the second feedstock with the proximal end of the length of the first feedstock; and cutting the second feedstock at a pre-determined length to provide a length of the second feedstock serially aligned with the length of the first feedstock to form a length of the multicomponent feedstock.

In some embodiments, positioning the portion of the second feedstock may be repeated a selected number of times. In some embodiments, the second feedstock may be selected from any of at least two feedstock sources.

In some embodiments, the method may further include splicing together a distal end and a proximal end of adjacent portions of feedstock. In some embodiments, the distal end and the proximal end of adjacent portions of feedstock may be spliced by heating one or both of the ends and melting them together. In some embodiments, the heat may be provided by conduction.

In some embodiments, the distal end and the proximal end of adjacent portions of feedstock may be spliced by chemical adhesion.

In some embodiments, the distal end and the proximal end of adjacent portions of feedstock may be spliced by mechanical mating. In some embodiments, the mechanical mating may be achieved by feeding the distal end and the proximal end of the adjacent portions of feedstock through a channel in a housing having at least one inwardly protruding member so that as the proximal and distal ends pass by the inwardly protruding member the feedstock partially flows around and is partially dragged by the at least one inwardly protruding member, producing a mechanical connection between the portions being spliced by dragging material from the proximal end back into the feedstock material of the adjacent distal end. In some embodiments, one or both of the channel and the at least one inwardly protruding member may be heated.

In some embodiments, the mechanical mating may be achieved by feeding the distal end and the proximal end of the adjacent portions of feedstock through a channel formed by at least two surfaces of different materials, one surface being of a material that promotes drag, so that as the proximal and distal ends pass by the surface that promotes drag, the feedstock is partially dragged by that surface, producing a mechanical connection between the portions being spliced by dragging material from the proximal end back into the feedstock material of the adjacent distal end.

In some embodiments, the method may further include: tracking an amount of the multicomponent feedstock as it is fed into the print head; and adjusting at least one of a production rate of the multicomponent feedstock, a consumption rate of the multicomponent feedstock by the print head, and an amount of the multicomponent feedstock dispensed by the print head at a particular point in the printer tool path, in response to the amount of the multicomponent feedstock fed into the print head. In some embodiments, the tracking the amount of the multicomponent feedstock may include passing the multicomponent feedstock between an idler wheel and a drive gear that is coupled to a rotary encoder such that, as the multicomponent feedstock moves between the drive gear and the idler wheel, the rotary encoder rotates causing the rotary encoder to determine a distance of travel of the multicomponent feedstock, which is indicative of the amount of the multicomponent feedstock fed into the print head. In some embodiments, the adjusting at least one of the production rate of the multicomponent feedstock, the consumption rate of the multicomponent feedstock, and the amount of the multicomponent feedstock dispensed at a particular point in the printer tool path may include transmitting the distance of travel or the amount of the multicomponent feedstock fed into the print head to a processor, the processor being programmed with instructions to adjust at least one of the production rate of the multicomponent feedstock, the consumption rate of the multicomponent feedstock, and the amount of the multicomponent feedstock dispensed at a particular point in the printer tool path. In some embodiments, the adjusting at least one of the production rate of the multicomponent feedstock, the consumption rate of the multicomponent feedstock, and the amount of the multicomponent feedstock dispensed at a particular point in the printer tool path may include transmitting the amount of the multicomponent feedstock fed into the print head to a processor, the processor being programmed with instructions to adjust at least one of the production rate of the multicomponent feedstock, the consumption rate of the multicomponent feedstock, and the amount of the multicomponent feedstock dispensed at a particular point in the printer tool path.

In some embodiments, the method may further include selectively passing the multicomponent feedstock to a nozzle of the print head by: feeding the multicomponent feedstock along a feedstock pathway in the print head; and when the multicomponent feedstock is to be extruded, actuating a valve to move the valve to a first position which provides a pathway for the multicomponent feedstock to enter the nozzle, and when the multicomponent feedstock is to be discarded, actuating the valve to move the valve to a second position which directs the multicomponent feedstock away from the nozzle. In some embodiments, the multicomponent feedstock may be directed away from the nozzle and into a repository.

In some embodiments, the method may further include selectively passing the multicomponent feedstock to a nozzle of the print head by: feeding the multicomponent feedstock along a feedstock pathway in the print head; and when a transition section of the multicomponent feedstock is to be discarded, pivoting the nozzle from a first position to a second position, and when the transition section has been discarded, moving the nozzle back to the first position and dispensing the multicomponent feedstock.

In some embodiments, the method may further include selectively passing the multicomponent feedstock to a nozzle of the print head by: feeding the multicomponent feedstock along a feedstock pathway in the print head; and when a transition section of the multicomponent feedstock is to be discarded, moving a repository from a first position that is away from the nozzle to a second position that is below the nozzle, and when the transition section has been discarded to the repository, moving the repository back to the first position and dispensing the multicomponent feedstock.

In some embodiments, the aligning and abutting the distal end of the second feedstock with the proximal end of the length of the first feedstock may include: feeding the distal end of the first feedstock into a first entrance port of a merger module, the merger module including an exit port aligned along an axis of the merger module, to direct the first feedstock through a tapered guide channel to emerge from the merger module aligned along the axis; and feeding the distal end of the second feedstock into at least a second entrance port of the merger module, to direct the distal end of the second feedstock through the tapered guide channel to emerge from the merger module aligned with the proximal end of the first feedstock. In some embodiments, the first feedstock and the second feedstock may be cut after emerging from the merger module. In some embodiments, the method may further include retracting the first feedstock before feeding the distal end of the second feedstock.

In some embodiments, the method may further include feeding the multicomponent feedstock through a feedstock quality management module to control feedstock cross section shape. In some embodiments, the multicomponent feedstock may be fed through a rigid member of the feedstock quality management module, the rigid member having an internal cross section shape corresponding to a desired feedstock external cross section shape such that, upon being fed through the rigid member, the multicomponent feedstock emerging from the rigid member has the desired external cross section shape. In some embodiments, the multicomponent feedstock may be fed between two roller wheels of the feedstock quality management module, the roller wheels cooperating to provide a cross section shape corresponding to a desired feedstock external cross section shape such that, upon being fed through the roller wheels, the multicomponent feedstock emerging from the roller wheels has the desired external cross section shape. In some embodiments, the method may further include cooling the multicomponent feedstock being fed through the feedstock quality management module. In some embodiments, the multicomponent feedstock may be cooled with a heat sink, coolant fluid, fan, or a combination thereof.

In some embodiments, the method may include the multicomponent feedstock being fed to the print head through a buffer that includes an expandable constrained passageway. In some embodiments, the expandable constrained passageway may include at least two tubes in series and connected by at least one coupler that has elastic properties. In some embodiments, the expandable constrained passageway may include at least two telescoping tubes.

In some embodiments, a common processor may control the forming of the multicomponent feedstock and the printer tool path. In some embodiments, a processor may control the forming of the multicomponent feedstock and a different processor may control the printer tool path.

According to a second aspect, the invention provides an apparatus for forming and feeding a multicomponent feedstock being delivered through a print head of a 3D printer, the apparatus including: at least one drive module to feed feedstock along a feed path; and a programmable controller to drive the at least one drive module concurrent with and in cooperation with control of a printer tool path to: at a multicomponent feedstock source coupled to but spaced from the print head by the feed path, position a portion of a first feedstock along the feed path and position a portion of a second feedstock along the feed path and in line with the portion of the first feedstock, the portions of feedstock being aligned in series to form the multicomponent feedstock; and feed the multicomponent feedstock along the feed path to the print head.

In some embodiments, the apparatus may further include a cutter module to cut the feedstock. In some embodiments, the controller may drive the at least one drive module to feed a distal end of the first feedstock along the feed path toward the print head, and drive the cutter module to cut the first feedstock at a pre-determined length to provide a length of the first feedstock having a proximal end and the distal end. In some embodiments, the controller may drive the at least one drive module to feed a distal end of the second feedstock along the feed path, aligning and abutting the distal end of the second feedstock with the proximal end of the length of the first feedstock, and drive the cutter module to cut the second feedstock at a pre-determined length to provide a length of the second feedstock serially aligned with the length of the first feedstock to form a length of the multicomponent feedstock.

In some embodiments, the first feedstock and the second feedstock may be selected from a plurality of feedstock that are positioned in parallel and attached to an actuator allowing relative motion between the plurality of feedstock and the cutting module.

In some embodiments, the controller may include a storage device storing computer readable instructions about the order and the pre-determined lengths of each of the portions of feedstock in the multicomponent feedstock.

In some embodiments, the apparatus may further include a splicer module for splicing together the aligned proximal and distal ends of adjacent portions of feedstock. In some embodiments, the splicer module may include a channel and an inwardly protruding member to mix the distal end and the proximal end of adjacent portions of feedstock being fed through the channel. In some embodiments, one or both of the channel and the inwardly protruding member may be heated. In some embodiments, the inwardly protruding member may include a plurality of inwardly protruding members.

In some embodiments, the splicer module may include a channel formed by at least two surfaces of different materials, one surface being of a material that promotes drag to mix the distal end and the proximal end of adjacent portions of feedstock being fed through the channel.

In some embodiments, the splicer module may include at least two surfaces with at least one of the surfaces being under temperature control, and wherein at least one of the surfaces is movable such that the splicer module can be spaced from the multicomponent feedstock. In some embodiments, each of the surfaces under temperature control may be independently heated or cooled to a respective selected temperature.

In some embodiments, the splicer module may include at least one non-heated surface that is positioned to support the multicomponent feedstock passing through the splicer module.

In some embodiments, the apparatus including a splicer may further include a heating component to melt together the proximal end and the distal end of adjacent portions of feedstock. In some embodiments, the heat may be provided by conduction. In some embodiments, the apparatus may further include a cooling component to cool the proximal end and the distal end of adjacent portions of feedstock after being melted together. In some embodiments, the cooling component may be a heat sink, coolant fluid, fan, or combination thereof.

In some embodiments, the first feedstock and the second feedstock may be spooled feedstock in the form of filament.

In some embodiments, the apparatus may further include a multicomponent feedstock monitoring module, the monitoring module including: a monitoring device mounted adjacent to a feedstock pathway into the print head, the monitoring device configured to track an amount of the multicomponent feedstock fed into the print head; and a processor operatively connected to the monitoring device, the processor programmed with instructions to adjust at least one of a production rate of the multicomponent feedstock, a consumption rate of the multicomponent feedstock by the print head, and an amount of the multicomponent feedstock dispensed by the print head at a particular point in the printer tool path, in response to the amount of the multicomponent feedstock fed into the print head.

In some embodiments, the monitoring device may include a drive gear spaced from an idler wheel a distance sufficient to receive the multicomponent feedstock therebetween, and further include a rotary encoder connected to the drive gear such that as the multicomponent feedstock moves between the drive gear and the idler wheel, the rotary encoder rotates causing the rotary encoder to determine a distance of travel of the multicomponent feedstock, the distance of travel being indicative of the amount of the multicomponent feedstock fed into the print head.

In some embodiments, the monitoring device may include an optical sensor having a field of view trained on the feedstock pathway into the print head.

In some embodiments, the apparatus may further include a feedstock valve device coupled to the print head, the device including: a valve positioned along a feedstock pathway in the print head; and an actuator connected to the valve, the actuator being configured to move the valve between a first position, which provides a pathway for the multicomponent feedstock to enter a nozzle of the print head for being extruded out the print head, and a second position, which directs the multicomponent feedstock away from the nozzle. In some embodiments, the apparatus may further include a repository to receive the feedstock directed away from the nozzle. In some embodiments, the actuator may be operatively connected to a processor, the processor being programmed with instructions to instruct the actuator to move between the first and second positions.

In some embodiments, the apparatus may further include a device for selectively dispensing the multicomponent feedstock, the device including: a nozzle of the print head, the nozzle pivotable between a first position and a second position; and an actuator coupled to the nozzle, the actuator configured to: pivot the nozzle from the first position to the second position when a transition section of the multicomponent feedstock is to be discarded, and move the nozzle back to the first position to dispense the multicomponent feedstock when the transition section has been discarded.

In some embodiments, the apparatus may further include a device for selectively dispensing the multicomponent feedstock, the device including: a repository movable between a first position that is away from a nozzle of the print head and a second position that is below the nozzle; and an actuator coupled to the repository, the actuator being configured to: when a transition section of the multicomponent feedstock is to be discarded, move the repository from the first position to the second position, and when the transition section has been discarded to the repository, move the repository back to the first position for dispensing the multicomponent feedstock from the nozzle.

In some embodiments, the apparatus may further include a merger module to align the proximal end of the first feedstock adjacent to the distal end of the second feedstock. In some embodiments, the controller may drive the at least one drive module to: feed the distal end of the first feedstock into a first entrance port of the merger module, the merger module including an exit port aligned along an axis of the merger module, to direct the first feedstock through a tapered guide channel to emerge from the merger module aligned along the axis, and feed the distal end of the second feedstock into at least a second entrance port of the merger module to direct the distal end of the second feedstock through the tapered guide channel to emerge from the merger module aligned with the proximal end of the first feedstock.

In some embodiments, the cutter module may be positioned between the merger module and the print head.

In some embodiments, the apparatus may further include a feedstock quality management module through which the multicomponent feedstock passes to control feedstock cross section shape. In some embodiments, the multicomponent feedstock may pass through a rigid member of the feedstock quality management module, the rigid member having an internal cross section shape corresponding to a desired feedstock external cross section shape such that, upon passage through the rigid member, the multicomponent feedstock emerging from the rigid member has the desired external cross section shape. In some embodiments, the multicomponent feedstock may pass between two roller wheels of the feedstock quality management module, the roller wheels cooperating to provide a cross section shape corresponding to a desired feedstock external cross section shape such that, upon being fed through the roller wheels, the multicomponent feedstock emerging from the roller wheels has the desired external cross section shape.

In some embodiments, the feedstock quality management module may include a cooling component to cool the multicomponent feedstock. In some embodiments, the cooling component may be a heat sink, coolant fluid, fan, or combination thereof.

In some embodiments, the apparatus may further include a buffer that includes an expandable constrained passageway through which the multicomponent feedstock is fed to the print head. In some embodiments, the expandable constrained passageway may include at least two tubes in series and connected by at least one coupler that has elastic properties. In some embodiments, the expandable constrained passageway may include at least two telescoping tubes.

In some embodiments, the programmable controller may control the printer tool path.

According to a third aspect, the invention provides a feedstock monitoring device to monitor a feedstock being delivered through a print head of a 3D printer, the device including: a monitoring device mounted adjacent to a feedstock pathway into the print head of the 3D printer, the monitoring device configured to track an amount of the feedstock fed into the print head; and a processor operatively connected to the monitoring device, the processor programmed with instructions to adjust at least one of a production rate of the feedstock, a consumption rate of the feedstock by the print head, and an amount of the feedstock dispensed by the print head, in response to the amount of the feedstock fed into the print head.

In some embodiments, the monitoring device may include a drive gear spaced from an idler wheel a distance sufficient to receive the feedstock therebetween, and further include a rotary encoder connected to the drive gear such that as the feedstock moves between the drive gear and the idler wheel, the rotary encoder rotates causing the rotary encoder to determine a distance of travel of the feedstock, the distance of travel being indicative of the amount of the feedstock fed into the print head. In some embodiments, the drive gear and idler wheel may be identical in at least one of size and material.

In some embodiments, the monitoring device may include an optical sensor having a field of view trained on the feedstock pathway into the print head.

According to a fourth aspect, the invention provides a method for monitoring a feedstock fed into a print head of a 3D printer, the method including: tracking an amount of the feedstock as it is fed into the print head of the 3D printer; and adjusting at least one of a production rate of the feedstock, a consumption rate of the feedstock by the print head, and an amount of the feedstock dispensed by the print head, in response to the amount of the feedstock fed into the print head. In some embodiments, the tracking the amount of the feedstock may include passing the feedstock between an idler wheel and a drive gear that is coupled to a rotary encoder such that as the feedstock moves between the drive gear and the idler wheel, the rotary encoder rotates causing the rotary encoder to determine a distance of travel of the feedstock, the distance of travel being indicative of the amount of the feedstock fed into the print head. In some embodiments, the adjusting the at least one of the production rate of the feedstock, the consumption rate of the feedstock, and the amount of the feedstock dispensed may include transmitting the distance of travel or the amount of the feedstock fed into the print head to a processor, the processor being programmed with instructions to adjust at least one of the production rate of the feedstock, the consumption rate of the feedstock, and the amount of the feedstock dispensed. In some embodiments, the adjusting the at least one of the production rate of the feedstock, the consumption rate of the feedstock, and the amount of the feedstock dispensed may include transmitting the amount of the feedstock fed into the print head to a processor, the processor being programmed with instructions to adjust at least one of the production rate of the feedstock, the consumption rate of the feedstock, and the amount of the feedstock dispensed.

According to a fifth aspect, the invention provides a device for selectively dispensing feedstock from a print head of a 3D printer, the device including: a diverter configured to be coupled to the print head; and an actuator coupled to the diverter, the actuator being configured to move the diverter between a first position to dispense a feedstock from the print head and a second position to discard the feedstock.

In some embodiments, the diverter may include a valve coupled to the print head, the valve positioned along a feedstock pathway in the print head; and the actuator coupled to the valve, the actuator being configured to move the valve between the first position, which provides a pathway for the feedstock to enter a nozzle of the print head for being extruded out the print head, and the second position, which directs the feedstock away from the nozzle.

In some embodiments, the diverter may include a nozzle of the print head, the nozzle pivotable between the first position and the second position; and the actuator coupled to the nozzle and configured to: pivot the nozzle from the first position to the second position when a portion of the feedstock is to be discarded, and move the nozzle back to the first position to dispense the feedstock when the portion has been discarded.

In some embodiments, the diverter may include a repository, the repository movable between the first position that is away from a nozzle of the print head and the second position that is below the nozzle; and the actuator coupled to the repository, the actuator being configured to: when a portion of the feedstock is to be discarded, move the repository from the first position to the second position, and when the portion has been discarded to the repository, move the repository back to the first position for dispensing the feedstock from the nozzle.

In some embodiments, the actuator may be operatively connected to a processor, the processor being programmed with instructions to instruct the actuator to move the diverter between the first and second positions.

According to a sixth aspect, the invention provides a method of selectively dispensing feedstock from a print head of a 3D printer, including: feeding a feedstock along a pathway in the print head; and when the feedstock is to be extruded, actuating a diverter to move the diverter to a first position for dispensing the feedstock, and when the feedstock is to be discarded, actuating the diverter to move the diverter to a second position for discarding the feedstock.

In some embodiments, the diverter may include a valve coupled to the print head and the method further include: when the feedstock is to be extruded, actuating the valve to move the valve to the first position, which provides a pathway for the feedstock to enter a nozzle of the print head, and when the feedstock is to be discarded, actuating the valve to move the valve to the second position, which directs the feedstock away from the nozzle.

In some embodiments, the diverter may include a nozzle of the print head and the method further include: when a portion of the feedstock is to be discarded, pivoting the nozzle from the first position to the second position, and when the portion has been discarded, moving the nozzle back to the first position and dispensing the feedstock.

In some embodiments, the diverter may include a repository and the method further include: when a portion of the feedstock is to be discarded, moving the repository from the first position that is away from a nozzle of the print head to the second position that is below the nozzle, and when the portion has been discarded to the repository, moving the repository back to the first position and dispensing the feedstock.

In some embodiments, actuating the diverter may be under control of a processor, the processor being programmed with instructions to instruct an actuator to move the diverter between the first and second positions.

According to a seventh aspect, the invention provides an apparatus for forming a multicomponent feedstock, including: a plurality of feedstock positioned in parallel, each feedstock associated with a drive module to drive the feedstock; a cutter to cut pre-determined lengths of feedstock; and an actuator coupled to either the plurality of feedstock or the cutter, the actuator enabling relative motion between the plurality of feedstock and the cutter to selectively align any one of the plurality of feedstock with the cutter, each drive module being powered by a common drive powering component, the actuator aligning a selected drive module with the common drive powering component and the cutter. In some embodiments, the actuator may be a linear actuator. In some embodiments, the actuator may be coupled to the plurality of feedstock.

According to an eighth aspect, the invention provides a method of producing multicomponent feedstock, including: advancing a first feedstock past a minimum retract line and through a merger; advancing the first feedstock past the merger by a pre-determined length; cutting the first feedstock with a cutter to provide a length of the first feedstock having a proximal end; retracting the first feedstock to the minimum retract line; advancing a second feedstock past the minimum retract line and through the merger; advancing a leading edge of the second feedstock toward the proximal end of the length of the first feedstock; and advancing the second feedstock past the merger by a pre-determined length, the second feedstock in line with the length of the first feedstock. In some embodiments, the method may further include cutting the second feedstock with the cutter to provide a length of the second feedstock serially aligned with the length of the first feedstock. In some embodiments, the method may further include, prior to advancing the first feedstock past the minimum retract line, positioning the first feedstock and the second feedstock near the merger and at or proximal to the minimum retract line.

In some embodiments, the merger may include a tapered guide channel extending between at least two input ports and an exit port, the first feedstock and the second feedstock passing through the tapered guide channel.

In some embodiments, the second feedstock may be selected from any of at least two feedstock sources.

In some embodiments, the method may further include sensing feedstock at an input of the merger or an output of the merger.

In some embodiments, the method may further include: clearing the merger by retracting any feedstock sensed at the input of the merger; and for each feedstock, homing the feedstock by selectively advancing the feedstock into the cleared merger until a leading edge of the feedstock is sensed at the input of the merger or the output of the merger.

According to a ninth aspect, the invention provides an apparatus for 3D printing, including: a feedstock source producing multicomponent feedstock under control of source software; and a print head delivering material according to a tool path under control of tool path software, the feedstock source to produce the multicomponent feedstock and deliver it to the print head concurrent with and in cooperation with control of the tool path. In some embodiments, the source software and the tool path software may communicate to enforce cooperation.

In some embodiments, the apparatus may further include a feedstock monitoring device positioned between the feedstock source and the print head, the monitoring device in communication with the feedstock source and configured to track movement of the multicomponent feedstock.

In some embodiments, the tool path software may execute a ping sequence to signal to the feedstock source a point in the control of the tool path. In some embodiments, the feedstock monitoring device may detect a movement signature corresponding to the ping sequence in the movement of the multicomponent feedstock.

In some embodiments, the source software may execute a corrective action in response to the ping sequence. In some embodiments, the corrective action may include adjusting a rate of production of the multicomponent feedstock. In some embodiments, the corrective action may include causing the tool path software to adjust a rate of consumption of the multicomponent feedstock by the print head. In some embodiments, the corrective action may include causing the tool path software to adjust the amount of material delivered by the print head at a particular point of the tool path.

In some embodiments, the tool path software may execute plural ping sequences, a first of the plural ping sequences corresponding to a position of the multicomponent feedstock upon being loaded into the print head.

In some embodiments, the feedstock source may produce transitions in the multicomponent feedstock concurrent with and in cooperation with control of the tool path. In some embodiments, the tool path software may cause the print head to selectively discard one or more of the transitions in the multicomponent feedstock.

According to a tenth aspect, the invention provides an apparatus for buffering feedstock fed into a feedstock input of a 3D printer, the apparatus including: a 3D printer having a feedstock input driver; a feedstock source having a feedstock output driver; and a feedstock buffer between the input driver and the output driver.

In some embodiments, the feedstock source may be a multicomponent feedstock source.

In some embodiments, the feedstock buffer may include an expandable constrained passageway through which the feedstock is fed to the 3D printer. In some embodiments, the expandable constrained passageway may include at least two tubes in series and connected by at least one coupler that has elastic properties. In some embodiments, the expandable constrained passageway may include at least two telescoping tubes.

In some embodiments, the apparatus may further include a feedstock monitoring device positioned between the output driver and the input driver to track movement of the feedstock.

In some embodiments, the apparatus may further include a feedstock monitoring device positioned between the output driver and the input driver to track a size of the feedstock buffer, which is indicative of the feedstock amount.

According to an eleventh aspect, the invention provides a method for producing a single feed from two or more sources of feedstock and feeding same into an extruder, including: (a) providing at least two sources of feedstock of different material; (b) feeding a distal end of an initial feedstock along a feedpath; (c) cutting the first feedstock at a pre-determined length to provide a length of first feedstock having a proximal end; and at least (d) feeding a distal end of a different feedstock along the feedpath and aligning and abutting the distal end of the different feedstock with the proximal end of the length of the initial feedstock; (e) cutting the different feedstock at a pre-determined length to provide a length of the different feedstock serially aligned with the length of initial feedstock to form a length of multicomponent feedstock; and (f) feeding the length of multicomponent feedstock into an extruder.

In some embodiments, steps (d) and (e) may be repeated a selected number of times using any of the at least two feedstock sources.

In some embodiments, the method may further include splicing together the distal end and the proximal end of adjacent feedstock.

In some embodiments, the distal end and the proximal end of adjacent feedstock may be spliced by heating and melting them into contact. In some embodiments, the heat may be provided by convection, conduction or radiation. In some embodiments, the spliced ends may be cooled after being melting into contact. In some embodiments, the cooling may be provided by a heat sink, coolant fluid, a fan or a combination thereof.

In some embodiments, the distal end and the proximal end of adjacent feedstock may be spliced by chemical adhesion.

In some embodiments, the distal end and the proximal end of adjacent feedstock may be spliced by mechanical mating. In some embodiments, the mechanical mating may be achieved by feeding the distal end and the proximal end of the adjacent feedstock through a channel in a housing having at least one inwardly protruding member so that as the proximal and distal ends pass by the inwardly protruding member the feedstock partially flows around and is partially dragged by the at least one inwardly protruding member producing a mechanical connection between the segments to be spliced by dragging material from the proximal end back into the feedstock material in the adjacent distal end thus mechanically intertwining the feedstock materials. In some embodiments, one or both of the channel and the inwardly at least one protruding member may be heated.

In some embodiments, the at least two sources of feedstock may include metals, ceramics, polymers, or plastics.

In some embodiments, the at least two sources of feedstock may be spooled feedstock in the form of fibers or wires.

In some embodiments, the method may include a step of adjusting a rate of production of the multicomponent feedstock material to match a rate of travel of the multicomponent feedstock material into an extruder by: tracking and recording movement of the multicomponent feedstock material as it is fed into an extruder and calculating a rate of travel of the multicomponent feedstock material into the extruder; and adjusting a production rate of the multicomponent feedstock material to match the rate of travel of the multicomponent feedstock material into the extruder.

In some embodiments, the step of tracking and recording movement of the multicomponent feedstock material may include passing the multicomponent feedstock material between an idler wheel and a drive gear which is connected to a rotary encoder such that as the multicomponent feedstock material moves between the drive gear and the idler wheel, the rotary encoder rotates and records and calculates the rate of travel of the multicomponent feedstock, and the step of adjusting a production rate of the multicomponent feedstock material to match the rate of travel of the feedstock material into the extruder may include transmitting the rate of travel of the multicomponent feedstock to a computer processor, the computer processor being programmed with instructions to adjust the production rate of the multicomponent feedstock material.

In some embodiments, the method may include a step of selectively passing the multicomponent feedstock material to a nozzle of an extruder by the steps of: feeding a feedstock material along a feedstock pathway in an extruder, and when the multicomponent feedstock material is to be extruded, actuating a valve to move the valve to a first position which provides a pathway for the multicomponent feedstock material to enter an extruder nozzle for being extruded out the extruder, and when the multicomponent feedstock material is to be discarded, actuating the valve to move it to a second position which diverts the multicomponent feedstock material away from the extruder nozzle. In some embodiments, the actuator may be connected to a computer processor, the computer processor being programmed with instructions to instruct the actuator to move between the first and second positions and vice versa.

In some embodiments, the method may include a step of selectively passing the multicomponent feedstock material to a nozzle of an extruder by the steps of: feeding a feedstock material along a feedstock pathway in an extruder, and when a transition section of the multicomponent feedstock material is to be discarded, pivoting the nozzle from dispensing position to a non dispensing position, and when the transition section has been discarded, moving the nozzle back to the dispensing position and dispensing the multicomponent feedstock material.

In some embodiments, the step of aligning and abutting the distal end of the different feedstock with the proximal end of the length of the initial feedstock may include: feeding the distal end of the initial feedstock into a first entrance port of a guide housing, the guide housing including an exit port aligned along a longitudinal axis of the guide housing, the entrance port being located off center of the longitudinal axis, including a first tapered guide channel extending from the entrance port to the exit port to direct the initial feedstock through the guide channel to emerge from the guide housing aligned along the longitudinal axis; and feeding the distal end of the different feedstock into at least a second entrance port of the guide housing that is off center from the longitudinal axis through at least a second tapered guide channel extending from the entrance port to the exit port such that the distal end of the different feedstock is aligned with the proximal end of the initial feedstock.

In some embodiments, the method may include feeding the multicomponent feedstock material through a rigid member having an internal cross section shape corresponding to a desired external cross section shape such that upon being fed through the rigid member the multicomponent feedstock material emerging from the rigid member has the desired external cross section.

In some embodiments, the multicomponent feedstock may be fed to the extruder through an expandable constrained passageway. In some embodiments, the expandable constrained passageway may include at least two constrained tubes having elastic members incorporated therein in series connected by at least one coupler, wherein the coupler has elastic properties.

In some embodiments, the extruder may be a 3D printer extruder.

According to a twelfth aspect, the invention provides a system for forming a multi-material series of feedstock for use in association with an extruder, including: a plurality of feedstock; a cutting module for cutting the feedstock at pre-determined lengths; a merger module for aligning the proximal end of a first feedstock adjacent to the distal end of a second feedstock; and one or more drive modules for feeding the feedstock into the merger module and into an entrance of an extruder.

In some embodiments, the system may further include a computer processor operably connected to the cutting module, the one or more drive modules and a storage device storing computer readable instructions about the order and the pre-determined lengths of each of the plurality of feedstock in the multi-material series of feedstock.

In some embodiments, the system may further include a splicer module for splicing together the aligned proximal end and the distal end of adjacent feedstock.

In some embodiments, the splicer module may include a channel and an inwardly protruding member to partially mix the distal end and the proximal end of adjacent feedstock being fed through the channel. In some embodiments, one or both of the channel and the inwardly protruding member may be heated.

In some embodiments, the splicer module may include at least two surfaces with at least one of the surfaces being heating surface(s), and wherein one or both of the surfaces is movable such that the splicer module can be spaced from the multicomponent feedstock. In some embodiments, each of the heating surfaces may be heated and/or cooled to a selected temperature independent of all other heating surfaces.

In some embodiments, the splicer module may include at least one non-heated surface positioned to support the multicomponent feedstock feedstock passing through the splicer module.

In some embodiments, the system may further including a heating component for melting together the aligned proximal end and the distal end of adjacent feedstock. In some embodiments, the heat may be provided by convection, conduction or radiation. In some embodiments, the system may further include a cooling component for cooling the proximal end and distal end of adjacent feedstock after being melted together. In some embodiments, the cooling component may be a heat sink, coolant fluid, a fan or a combination thereof.

In some embodiments, the system may further include an expandable constrained passageway for feeding the multi-material series of feedstock to the extruder. In some embodiments, the expandable constrained passageway may include at least two constrained tubes in series connected by at least one coupler, wherein the coupler has elastic properties.

In some embodiments, the feedstock may include metals, ceramics, polymers, fibers, or plastics.

In some embodiments, the system may include a multi-component feedstock monitoring device for coupling to an extruder, including: a monitoring device mounted adjacent to a feedstock pathway into an extruder, the monitoring device configured to track and record movement of a feedstock material as it is fed into an extruder for calculating a rate of travel of the feedstock material into the extruder; and a computer processor connected to the monitoring device, the computer processor programmed with instructions to adjust a production rate of the feedstock material to match the rate of travel of the feedstock material into the extruder.

In some embodiments, the monitoring device may include a drive gear spaced from an idler wheel a distance sufficient to receive the feedstock material therebetween, and a rotary encoder connected to the drive gear such that as the feedstock material moves between the drive gear and the idler wheel, the rotary encoder rotates and records and calculates the rate of travel of the feedstock, the rotary encoder being connected to the computer processor.

In some embodiments, the monitoring device may include an optical camera having a field of view trained on a location adjacent an input of the extruder through which the feedstock material passes.

In some embodiments, the system may include a multi-component feedstock monitoring device for coupling to an extruder, including: means for monitoring movement of a feedstock material as it is fed into an extruder; means for calculating a rate of travel of the feedstock material into the extruder; and means for adjusting a production rate of the feedstock material to match the rate of travel of the feedstock material into the extruder.

In some embodiments, the system may include a feedstock valve device for coupling to an extruder, including: a valve positioned along a feedstock material feed pathway in an extruder, an actuator connected to the valve, the actuator being configured to move the valve between a first position which provides a pathway for the feedstock material to enter an extruder nozzle for being extruded out the extruder and a second position which diverts the feedstock material away from the extruder nozzle. In some embodiments, the actuator may be connected to a computer processor, the computer processor being programmed with instructions to instruct the actuator to move between the first and second positions and vice versa.

In some embodiments, the plurality of feedstock may be positioned in parallel and attached to a linear or rotary actuator allowing relative motion between the plurality of feedstock and the cutting module.

According to a thirteenth aspect, the invention provides a feedstock monitoring device for coupling to an extruder, including: a monitoring device mounted adjacent to a feedstock pathway into an extruder, the monitoring device configured to track and record movement of a feedstock material as it is fed into an extruder for calculating a rate of travel of the feedstock material into the extruder; and a computer processor connected to the monitoring device, the computer processor programmed with instructions to adjust a production rate of the feedstock material to match the rate of travel of the feedstock material into the extruder.

In some embodiments, the monitoring device may include drive gear spaced from an idler wheel a distance sufficient to receive the feedstock material therebetween, and a rotary encoder connected to the drive gear such that as the feedstock material moves between the drive gear and the idler wheel, the rotary encoder rotates and records and calculates the rate of travel of the feedstock, the rotary encoder being connected to the computer processor.

In some embodiments, the monitoring device may include an optical camera having a field of view trained on a location adjacent an input of the extruder through which the feedstock material passes.

According to a fourteenth aspect, the invention provides a feedstock monitoring device for coupling to an extruder, including: means for monitoring movement of a feedstock material as it is fed into an extruder; means for calculating a rate of travel of the feedstock material into the extruder; and means for adjusting a production rate of the feedstock material to match the rate of travel of the feedstock material into the extruder.

According to a fifteenth aspect, the invention provides a method for adjusting a rate of production of a feedstock material to match a rate of travel of the feedstock material into an extruder, including the steps of: tracking and recording movement of a feedstock material as it is fed into an extruder and calculating a rate of travel of the feedstock material into the extruder; and adjusting a production rate of the feedstock material to match the rate of travel of the feedstock material into the extruder. In some embodiments, the step of tracking and recording movement of the feedstock material may include passing the feedstock material between an idler wheel and a drive gear which is connected to a rotary encoder such that as the feedstock material moves between the drive gear and the idler wheel, the rotary encoder rotates and records and calculates the rate of travel of the feedstock, wherein the step of adjusting a production rate of the feedstock material to match the rate of travel of the feedstock material into the extruder includes transmitting the rate of travel of the feedstock to a computer processor, the computer processor being programmed with instructions to adjust the production rate of the feedstock material.

According to a sixteenth aspect, the invention provides a feedstock valve device for coupling to an extruder, including: a valve positioned along a feedstock material feed pathway in an extruder, an actuator connected to the valve, the actuator being configured to move the valve between a first position which provides a pathway for the feedstock material to enter an extruder nozzle for being extruded out the extruder and a second position which diverts the feedstock material away from the extruder nozzle. In some embodiments, the actuator may be connected to a computer processor, the computer processor being programmed with instructions to instruct the actuator to move between the first and second positions and vice versa.

According to a seventeenth aspect, the invention provides a method of selectively passing a feedstock material to a nozzle of an extruder, including: feeding a feedstock material along a pathway in an extruder, and when the feedstock material is to be extruded, actuating a valve to move the valve to a first position which provides a pathway for the feedstock material to enter an extruder nozzle for being extruded out the extruder, and when the feedstock material is to be discarded, actuating the valve to move it to a second position which diverts the feedstock material away from the extruder nozzle. In some embodiments, the actuator may be connected to a computer processor, the computer processor being programmed with instructions to instruct the actuator to move between the first and second positions and vice versa.

According to an eighteenth aspect, the invention provides a system for forming a multi-material series of feedstock, including: a plurality of single-material feedstock positioned in parallel, each having a drive module for driving the feedstock; a cutter module for cutting pre-determined lengths of feedstock; and a linear or rotary actuator attachable to either the plurality of feedstock or the cutter module enabling relative motion between the plurality of feedstock and the cutter module.

In some embodiments, the linear actuator may be attached to the plurality of single material feedstock and may selectively align the output of any one of the plurality of single-material feedstock with the input of the cutter module.

In some embodiments, the drive module of each of the plurality of single-material feedstock may be powered by a drive powering component attached to the cutter module such that the drive powering component can actuate the drive module of the single material feedstock with which the cutting module is selectively aligned.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

As shown in FIG. 1A, the multicomponent feedstock 203 includes a segment of input feedstock 201 is followed by a segment of input feedstock 200.

DETAILED DESCRIPTION

Figure 1A:
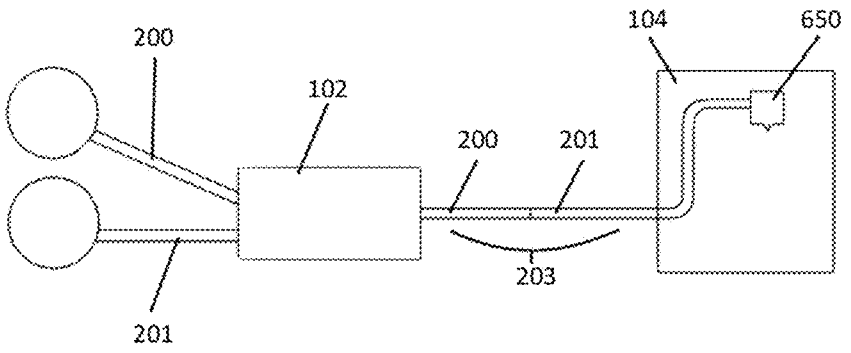
FIG. 1A schematically illustrates one embodiment for SEME technology where one or more spool(s) of feedstocks 200 and 201 pass into the SEME module 102. The SEME module passes output feedstock 203 into the 3D printer 104. The feedstock passed into the printer may include of any of the input feedstocks (200 or 201) or a combination of different segments of them, i.e., multicomponent feedstock.

A description of example embodiments of the invention follows.

Without limitation, the majority of the systems described herein are directed to a series enabled multi-material extrusion technology. As required, embodiments of the present disclosure are provided herein. However, the disclosed embodiments are merely exemplary, and it should be understood that the disclosure may be embodied in many various and alternative forms.

The Figures are not to scale and some features may be exaggerated or minimized to show details of particular elements while related elements may have been eliminated to prevent obscuring certain aspects. Therefore, specific structural and functional details disclosed herein are not to be interpreted as limiting but merely as a basis for the claims and as a representative basis for teaching one skilled in the art to variously employ the present disclosure. The drawings are for the purposes of teaching and not limitation; the illustrated embodiments are directed to a series enabled multi-material extrusion technology.

As used herein, the term “about”, when used in conjunction with ranges of dimensions, temperatures or other physical properties or characteristics is meant to cover slight variations that may exist in the upper and lower limits of the ranges of dimensions so as to not exclude embodiments where on average most of the dimensions are satisfied but where statistically dimensions may exist outside this region. For example, in embodiments disclosed herein dimensions may be given but it will be understood that these are not meant to be limiting.

As used herein, the term “print head” is a component that delivers the material forming a 3D product. The print head typically includes a heated extrusion nozzle, and may also include an integral feedstock drive. In a Bowden type 3D printing system, the drive is displaced from the print head.

As used herein, the term “tool path” means controlled relative movement between a print head and a product support. The tool path can be a path that a print head of a 3D printer, e.g., a heated extrusion nozzle of the 3D printer, follows in making a printed product. Typically, the tool path is controlled by software code, such as Gcode.

As used herein, the term “feed path” means a path of feedstock from a source to a print head, the source typically being one or more spools of filament to be melted in a hot end of the print head.

As used herein, the term “coupled” means physically connected, but may be through other components including, for example, a feedstock monitor and a feedstock drive.

As used herein, the term “amount,” when used in conjunction with feedstock, covers, for example, a length of filament, a volume of powder, a rate of travel of feedstock and the like.

Prior to detailing the method of the present disclosure, current methods being used to producing printed parts using multiple feedstocks will be discussed and drawbacks with each identified.

Another parallel feed approach that is gaining popularity is one where multiple feedstocks enter the extruder in parallel. By controlling the volumetric rate at which each material enters, the composition of the material leaving the extruder can be controlled. Articles about this technology indicate that a large flaw with this method is that the multiple feeds do not fully mix to form a homogenous material before exiting the extruder. This can lead to what is referred to as the “multicolor toothpaste” effect where the cross section of the material exiting the extruder may have discrete differing bands of color or other properties. Attempts have been made to induce large amounts of shear stress to the material to achieve static mixing but the literature indicates that this has not solved the problem and creates backpressure issues. Active mixing, where an agitator mixes the materials together, has been shown to achieve adequate mixing although this requires a redesign of the extruder module. The series enabled extrusion method and system disclosed herein can work with existing extruders and need not rely on mixing thus mitigating the complicated modifications and mixing issues with the parallel feed approach described above.

Furthermore, another drawback to the active mixing solution (as well as the static mixing solution) is that the mix chamber becomes much larger than it may be in a standard single material fused deposition modeling 3D printer extruder. This increased volume leads to more surface area for material to adhere to. This can also increase the size of the melt zone inside the extruder. One skilled in the art may recognize that this material adhering to the surface area of the mix chamber and inside of the extruder nozzle will act to contaminate the material that passes through after it. For example, if a blue feedstock is actuated into the mix chamber it may adhere to the surfaces of the chamber, nozzle, agitator, and any other exposed surfaces. If next a white feedstock is actuated into the chamber, it may mix with the residue of the blue feedstock still adhered to the exposed surfaces in the mix chamber, causing the white material to take on a blue tint. This may lead to a large transition region between the end of the white material and the beginning of the blue material instead of a desired crisp beginning. An increased melt zone may also lead to a larger transition region as there is more material that needs to be flushed out. This is not advantageous as this transition region exhibits a lot of variability and usually becomes waste. The series enabled extrusion system and method disclosed below does not require an enlarged mixing chamber thus mitigating the negative effects caused by an enlarged chamber.

There are several approaches to series feed solutions, three common approaches being manual feed material swapping, the use of pre-fabricated multi-material feedstock, and altering a single feed material upstream of the 3D printer extruder. Manual feed swapping is when the feedstock entering the 3D printer extruder is manually changed during the 3D printing process. If for instance a blue feedstock is being used and then halfway through the print it is switched to a red feedstock, the resultant printed part would have a lower portion that is blue and an upper portion that is red. Although this method can achieve multi-material parts, it is a highly manual process with many limitations and drawbacks. For instance, it may be difficult to use segments smaller than approximately 5 cm. There is a high risk that the extruder will jam each time a new feedstock segment is manually passed into it. It is also very difficult to pass the correct lengths of feedstock into the extruder at the correct times to achieve a desired multi-material print pattern. It is sometimes desired to have several colors within each layer of a printer part. Using this manual method, it is very difficult to maintain accuracy and repeatability between layers.

In the series enabled extrusion technology disclosed below the process of swapping feedstocks is automated allowing for highly precise material handling that is unrealistic to achieve manually. This can allow for accurate lengths that may have very small segments and can be created at a rapid rate. Furthermore, in several embodiments, the segments of feedstock are attached together before being passed into an extruder which significantly reduces the likelihood of jamming that is present with the current manual methods.

The use of pre-fabricated multi-material feedstock is now possible using commercially available feedstock kits that allow small segments of feedstock to be manually connected together to form a longer strand. The different segments can be different materials thus allowing for multi-material parts to be created using a series approach. The limitations to this approach, aside from the manual nature, are that once again it is very difficult to pass such feedstock into the extruder at the correct timing to achieve a desired multi-material print pattern. It is also possible that the segments of feedstock can detach while being processed by the extruder, leading to undesired jams or other failures. The proposed series enabled extrusion method disclosed hereinafter offers the same benefits over this pre-fabricated multi-material feedstock option as it does over the manual feed swapping approach.

Altering the feedstock upstream of the extruder has been demonstrated using methods such as the application of inks, as well as induced change by other non-invasive means. For example, it is known in the art to dye feedstock, e.g., filament, such that different segments of the feedstock have different colors. There has been some success by these technologies in altering the aesthetic properties of the feedstock, such as color, but this method has not been shown to allow changes in other material properties such as, but not limited to, mechanical properties or conductivity. One skilled in the art may recognize that it is useful for feedstock to have uniform properties throughout to ensure high quality printer output. This is difficult to achieve when altering the feedstock in a non-invasive manner. Inks, dyes, or other chemicals used to alter the feedstock’s properties can also be detrimental to the quality of the printed parts. The series enabled extrusion method disclosed hereinafter may use materials that already have uniform properties thus providing a benefit over these other upstream methods. Furthermore, these materials may vary significantly from each other allowing for true multi-material extrusion with a wide range of material options.

For the purpose of this disclosure, the term printed part(s) refers to the component(s) being manufactured by the three dimensional (hereinafter abbreviated to "3D") printer including any other structures such as support material, waste structures, or any other relevant specimens constructed during the 3D printing process.

When discussing the application of color and multiple materials to 3D printed parts, it is useful to consider the differences between multicolor-layered printed parts, full color printed parts, and multicolor printed parts. The fused deposition modeling 3D printing process is typically a layered additive manufacturing method where parts are created layer by layer. Each layer consists of an outline(s) that becomes the external surface of the part(s) as well as infill, which becomes the hidden structure on the inside of the part. For aesthetic purposes, only the external outlines of each layer are of importance because they are the only portions of the part visible after the completion of the printing process. Multicolor-layered parts are those which have at least two layers that are different colors while each layer consists of one color, with the exception of transition regions. When a feedstock is changed on a fused deposition modeling 3D printer, there is usually a transition region between where the old feedstock ends and the new feedstock begins which is a mix between both materials. This transition region is typically undesirable as it may have mixed properties of both materials and can lead to a lack of a sharp transition between different colors/materials in the printed part.

A full color print would be one in which the entire visible surface area of the printed part can be made to be an arbitrary color. In a full color printer, the number of potential print colors exceeds the number of input colors. A multicolor print is similar to a full color print except that the number of colors present on the external surfaces is limited to a discrete finite number. In a multicolor print the number of potential print colors will typically be equal to the number of input feedstock colors. Although these terms are illustrated in terms of color, they also apply to all other properties that may differ between feedstocks. For example, the full color print concept when applied to different mechanical properties of input feedstocks may allow for a part to have a gradient of rigidity based on the appropriate combination of a feedstock with a high elastic modulus and one with a low elastic modulus.

It can be seen that of the plethora of current solutions that attempt to enable multi-material capabilities for extruders (with focus on the fused deposition modeling 3D printing use case), there are obvious limitations and drawbacks to each solution.

The present disclosure provides an alternative to the parallel feed approach where a series feed approach is taken. The series feed refers to the fact that multiple materials enter the extruder in series rather than in parallel or to separate parallel extruders. This provides a method of series enabled multi-material extrusion (hereinafter abbreviated to SEME).

As noted above, extrusion technology has endless applications and although the method disclosed herein provides a benefit to many of them, the method disclosed herein will be illustrated with respect to its application to fused deposition modeling 3D printing to illustrate its potential. However, the method disclosed herein is not restricted, or exclusive, to its use in fused deposition modeling 3D printing as it offers advantages over conventional extrusion technology in many applications outside of fused deposition modeling 3D printing.

The present SEME approach, provided by the inventors, which will be described in detail below, has many elements that are believed to be advantageous as of the date of this application and solve many of the problems present in the examples described above. The SEME technology disclosed herein may be integrated into fused deposition modeling 3D printers at an OEM stage or can be added to existing printers as an aftermarket retrofit. The aftermarket retrofit solution better illustrates some advantageous features of the present SEME solution and will thus be used as a framework for the description below. It should however be noted that the approach is not exclusive to its use as an external retrofit to existing fused deposition modeling 3D printing technology. Furthermore, although the embodiments described below are presented as components of a complete system, each component (and subcomponents within them) are to be considered non-exclusive and may have standalone utility.

Currently, fused deposition modeling 3D printers have feedstock stored in a location (typically in a spool form) that is consumed by the printer as it converts the feedstock into the 3D printed part(s). For the purpose of this disclosure, the term feedstock refers to the input material consumed by 3D printers, which may be a continuous filament, a powder, pellets, or any other viable form. To demonstrate how SEME technology can be used with this process to enable multi-material prints, it will be discussed as a SEME module inserted between the feedstock input(s) and the 3D printer extruder, although this is not to be an exclusive way the technology can be integrated. This set up can be seen in FIG. 1A which shows one embodiment for SEME technology where one or more spool(s) of feedstock 200 and 201 pass into the SEME module 102. The feedstock passed into the printer 104 may include a plurality of feedstock sources, with FIG. 1A showing two sources of the input feedstock 200 and 201 or a combination of different segments of them, such as the case shown in FIG. 1A, including a segment of input feedstock 201 followed by a segment of input feedstock 200. As shown, the printer includes an extruder 650 to dispense the feedstock.

Feedstock can be fed into an extruder with an output driver from a source of feedstock. For example, for a filament feedstock source, the output driver typically includes a drive wheel to drive filament. In the case of a pellet feedstock source, the output driver can be an extruder that receives pellets and extrudes material. For example, the feedstock source can be an extruder that receives pellets and produces filament, such as the FILASTRUDER device (http://www.filastruder.com). To 3D print using a feedstock source such as this, having a buffer system between the feedstock source and the print head can be advantageous.

Figure 1B:
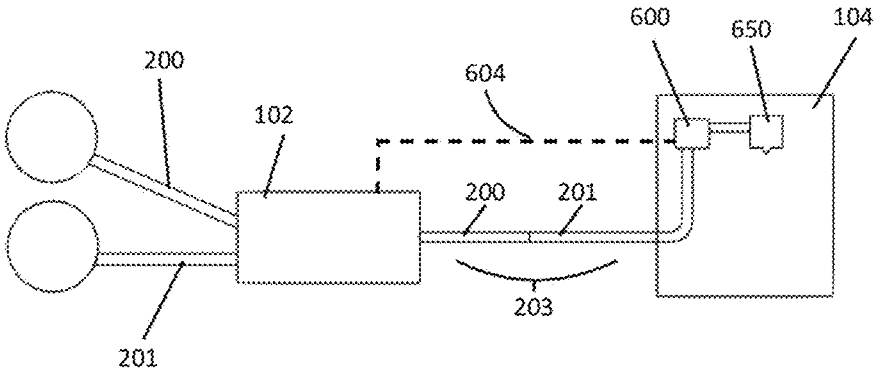
FIG. 1B schematically illustrates another example embodiment for SEME technology including a feedstock monitoring device 600 at the 3D printer 104.
Figure 1C:
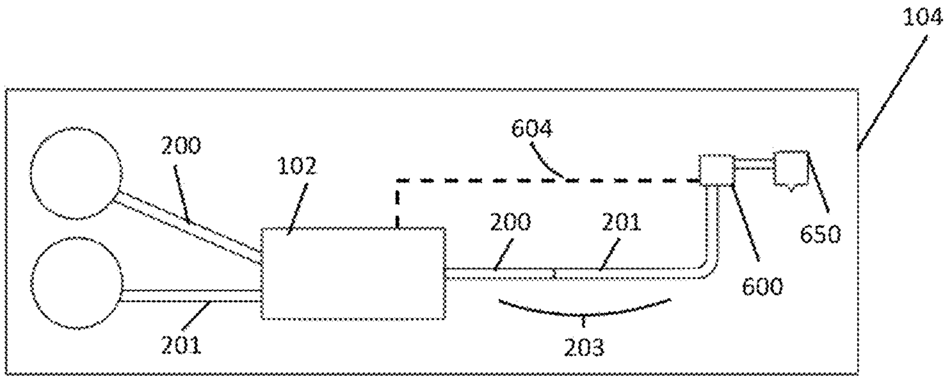
FIG. 1C schematically illustrates another example embodiment for SEME technology where the 3D printer 104 includes the SEME module 102 and other components of FIG. 1B.

As illustrated in FIG. 1B, a feedstock monitoring device 600 can be positioned at the 3D printer 104. The feedstock monitoring device 600 monitors movement of feedstock into the extruder 650 and can be configured to communicate data about the movement of the feedstock to the SEME module 102. The feedstock monitoring device 600 can be any feedstock monitoring device described herein, including the devices described with reference to FIGS. 3A-3C. As illustrated in FIG. 1C, the components of the SEME technology, such as those shown in FIG. 1B, can be integrated into the 3D printer 104.

Applying SEME technology in the manner illustrated in FIGS. 1A-1C, the SEME module 102 will have one or more inputs of feedstock 200 and 201 and will process it into a single output of multicomponent feedstock 203. Within the SEME module 102, there are several subsystems that, as a whole, work to combine one or more of the input feedstocks 200 and 201 together to create the aggregated (multicomponent) output feedstock 203. The process may occur using the steps shown in FIG. 2A beginning where the input feedstock(s) pass through a feedstock detector. It is important to note that although these steps are being presented as discrete events in a particular order, they can all occur multiple times along the process in any various orders.

Figure 2A:
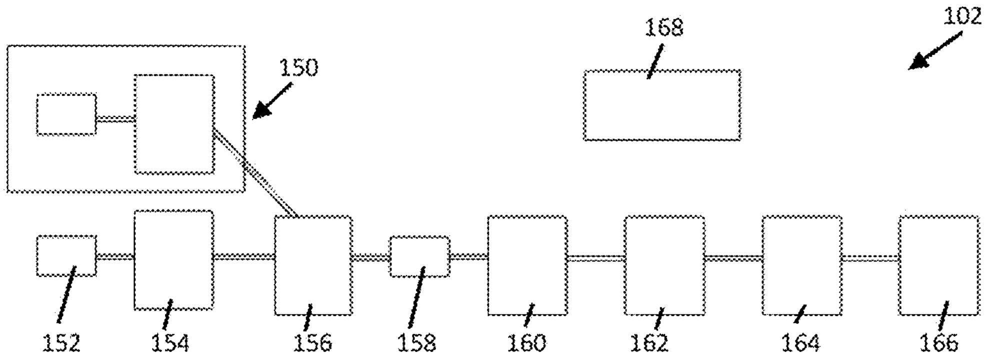
FIG. 2A schematically illustrates one example implementation of SEME technology showing SEME module 102. In this set up the feedstock enters the feedstock detector 152 and then passes into the input drive module 154. There may be a large number of similar feedstock detector and input drive module pairs that process other feedstocks in parallel. One example of the feedstock detector and input drive module pair is shown at 150. All of these feeds then enter the merger module 156. The feedstock is then passed into the feedstock detector 158, the cutter 160, the splicer 162, the feedstock quality management module (FQMM) 164, and finally into the outgoing drive module 166. The SEME module can include a controller 168 including a processor.

The eight process steps shown in FIG. 2A shows one example implementation of the present SEME technology, employing SEME module 102. In this set up the feedstock enters the feedstock detector 152 and then passes into the input drive module 154. There may be a large number of similar feedstock detector and input drive module pairs (one example is shown at 150) that process other feedstocks in parallel. All of these feeds then enter the merger module 156. The feedstock then passes through the feedstock detector 158, the cutter 160, into the splicer 162, through the feedstock quality management module (FQMM) 164, and finally into the outgoing drive module 166, which leads to the end of the SEME module 102 as it was defined previously. Each of the steps of the process will be described in more detail below, including several alternative and additional embodiments.

Figure 3A:
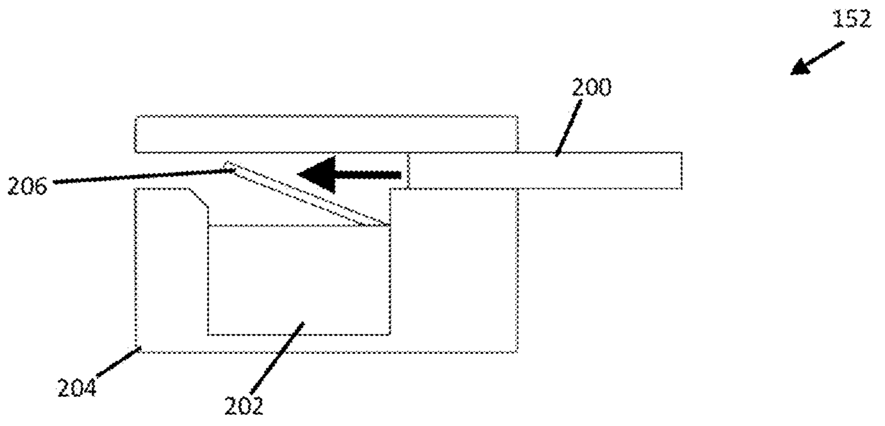
FIG. 3A shows a cross section view of one embodiment of the feedstock detector 152 which may comprise a mechanical switch 202 and a housing 204 that constrains the feedstock 200 entering the system. As the feedstock 200 enters the system it deflects the lever arm 206 of the mechanical switch 202 before exiting the housing 204.

Referring to FIG. 3A, the feedstock detector 152 is a specialized sensor that is able to detect the presence of feedstock 200. The feedstock detector 152 includes a mechanical switch which has an arm attached to it that interferes with the path that the feedstock 200 takes to travel through the feedstock detector 152 as shown in FIG. 3A. Specifically, FIG. 3A shows the feedstock detector 152 which may comprise a mechanical switch 202 and a housing 204 that constrains the feedstock 200 entering the system. As the feedstock 200 enters the system it deflects the lever arm 206 of the mechanical switch 202 before exiting the housing 204.

Figure 3B:
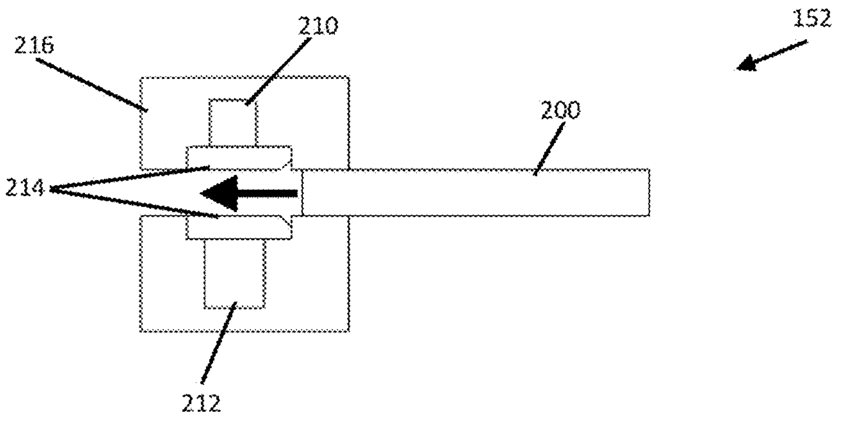
FIG. 3B shows a cross section view of an alternative embodiment of the feedstock detector 152 which may comprise a non-contact sensor with an emitter 212 and a detector 210. The feedstock 200 may enter a constrained passage 214 made from a material permeable to the communication from the emitter 212 to the detector 210 and may also be constrained in part by the detector housing 216.

As an alternative to a mechanical switch, a non-contact sensor may be used such as that shown in FIG. 3B, where the feedstock may pass between an emitter and detector of the sensor. The sensor may use electromagnetic radiation in the range of microwaves to ultraviolet in order to monitor the presence of feedstock, where such a sensor can include but is not limited to an optical color sensor, a camera, a laser interrupt, or an optical interrupt. By monitoring the sensory output of the detector 210 it has been shown that a unique signature can be realized for different types of feedstock allowing this module to be used to not only identify the presence but also certain properties of the feedstock passing through it. To position the feedstock within the non-contact sensor and to ensure a constrained path, a material may be used that is permeable to the radiation from the emitter 212 to the detector 210. This material may be, but is not limited to being, polytetrafluoroethylene (PTFE), PC (polycarbonate), PEEK (polyether ether ketone), or poly(methyl methacrylate) (PMMA). Further, it has been shown that by using a series of such sensors that are identical or different, a larger range of feedstock properties can be distinguished at a higher accuracy. Further, it has been shown that by using two or more of such sensors that are a calibrated distance apart, they can be used to determine feedstock movement rates and for other calibration exercises.

Figure 2B:
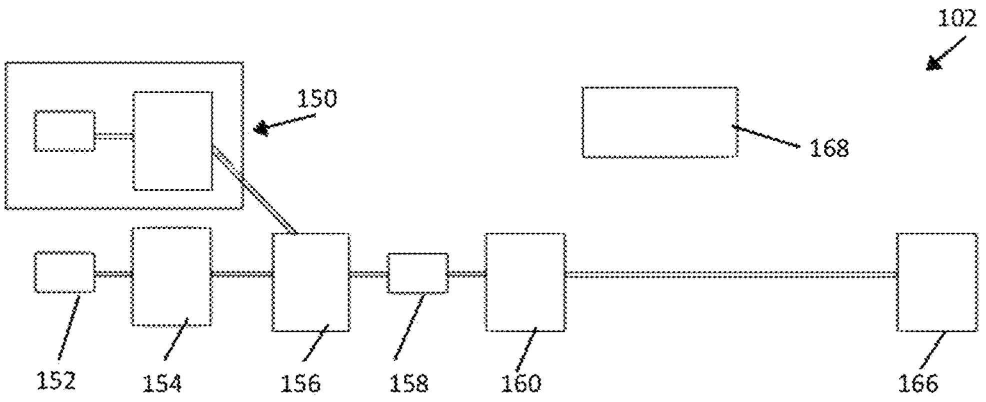
FIG. 2B schematically illustrates another example implementation of SEME technology that is similar to the example of FIG. 2A but does not include a splicer or a FQMM.
Figure 2C:
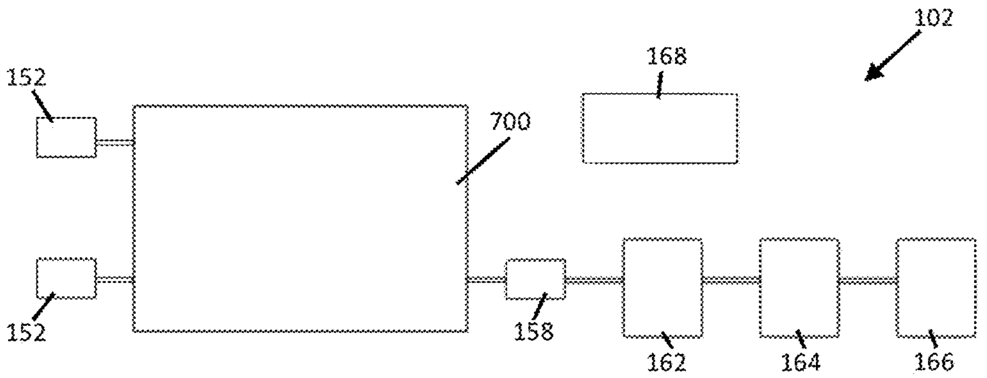
FIG. 2C schematically illustrates another example implementation of SEME technology including a sliding selection system 700 for selecting feedstock.
Figure 3C:
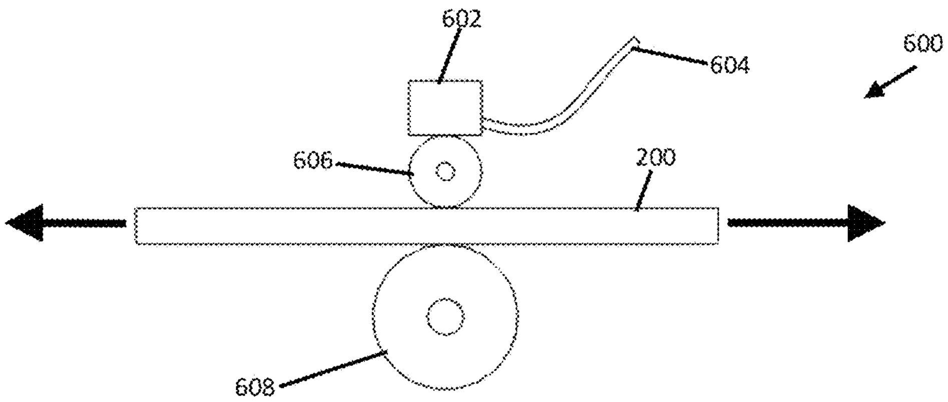
FIG. 3C shows a top view of another alternative embodiment of the feedstock detector referred to as scroll wheel module 600, comprising a rotary encoder 602 connected via a drive gear 606 to the feedstock 200 to monitor movement of the feedstock. An idler wheel 608 is shown in contact with the input feedstock 200 on the opposite side from the drive gear 606. Data may be transmitted to and from the system through the cable 604.

As an alternative to a mechanical or non-contact switch, a rotary scroll wheel can be used such as that shown in FIG. 3C. Feedstock monitoring device 600 comprises a rotary encoder 602 connected via a drive gear 606 to the feedstock 200. Sensor 602 is not limited to being a rotary encoder and may be any sensor or sensory system capable of encoding linear travel of the feedstock. An idler wheel 608 is shown in contact with the input feedstock 200 on the opposite side from the drive gear 606. Data may be transmitted to and from the system, e.g., the SEME module, through the cable 604. It has been shown that such a scroll wheel can be used to accurately detect the leading edge of a feedstock for the purpose of calibration or homing but also to accurately encode the precise movement of feedstock. As such, the scroll wheel allows a controller, such as controller 168 of FIGS. 2A-2C, to monitor the movement of feedstock to create a closed loop feedback system leading to improved system performance. For the purpose of this invention, the term controller refers to the controller having a processor (e.g., a computer control system) which controls the operations of the SEME module 102 and which may be built into the SEME module, a 3D printer, or be part of an external system. Typically, the controller is programmable. In one example, a controller controls the SEME module and a different controller controls the printer tool path. In another example, the same programmable controller controls the SEME module and the printer tool path. This feedstock sensor 152 can be used to indicate to the controller whether the feedstock 200 is present in a given feedstock input channel, the feedstock's rate and distance travelled, and certain properties of the present feedstock. As such, this sensor 152 is able to recognize if there is any interruption with the input feedstock 200, such as if it were to run out. Positioning this sensor 152 upstream of the input drive module 154 allows the further functionality of detecting any interruption prior to entering the input drive module 154, which allows the system to retract the feedstock if this situation occurs. A preferred location of feedstock sensor 152 is as shown in FIG. 2A, however it will be appreciated that the feedstock sensor may, in an alternative embodiment, be positioned downstream of input drive module 154. It is noted however that if the feedstock sensor 152 is positioned downstream of the input drive module 154 then the system may be unable to retract the feedstock 200 as it may have already passed fully through the input drive module 154. This may jam the system and prevent it from working and thus the solution of placing it upstream is useful because it overcomes this issue. A feedstock monitoring device (e.g., a scroll wheel or optical sensor) may be employed at various positions in a fused deposition modeling 3D printing system to monitor feedstock movement and provide information, e.g., about feedstock production and/or consumption.

Figure 4:
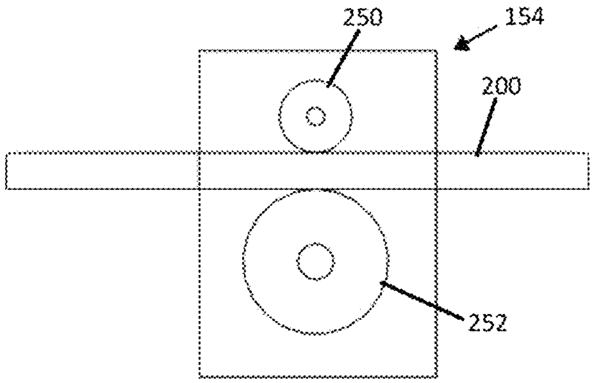
FIG. 4 shows drive module 154 which includes a drive gear 250 that contacts the feedstock 200 in the system. An idler wheel 252 is shown in contact with the input feedstock 200 on the opposite side from the drive gear 250.

The input drive module 154 is a system which is responsible for controlling the position of the input feedstock. The input drive module 154 has a motor built into it that is able to actuate the feedstock 200 linearly via a drive gear that is in contact with the feedstock as shown in FIG. 4. More particularly, FIG. 4 shows the input drive module 154 which includes a drive gear 250 that contacts the feedstock 200 in the system. An idler wheel 252 is shown in contact with the input feedstock 200 on the opposite side from the drive gear 250.

Each input drive module 154 is able to control the positioning of one input feedstock 200; thus with this design, one input drive module 154 is needed for each input feedstock 200. When the feedstock 200 leaves the input drive module 154 it is passed through a constrained passage. This passage may be made from a tube that has a low friction surface such as, but not restricted to, PTFE tubing.

Figure 5A:
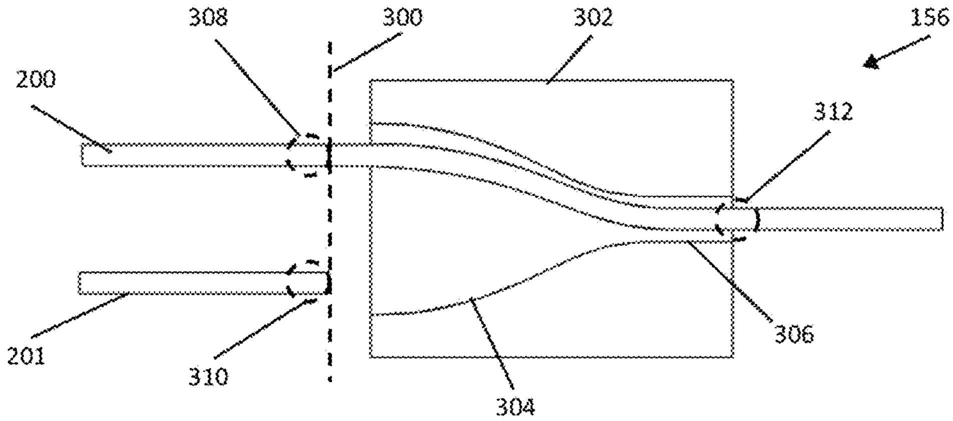
FIG. 5A illustrates the merger module 156 which may take in one or more input feedstocks 200 and 201. To the right of the minimum retract line 300, the internal contour 304 tapers down to a constant diameter section 306 that the single feedstock 200 exits.

The merger module is a component which creates a smooth passage for one or more outputs of the input drive modules to converge into a single path as shown in FIG. 5A, which shows the merger module 156 which may take in one or more input feedstocks 200 or 201. The merger module 156 can include a guide housing 302, a first entrance port 308, at least a second entrance port 310, a tapered guide channel formed by internal contour 304, and an exit port 312. To the right of the minimum retract line 300, the internal contour 304 tapers down to a constant diameter section 306 that the single feedstock 200 exits. The input feedstocks may enter the merger 156 angled towards this constant diameter section 306 to reduce the deformation required to the feedstock as it conforms to this section.

The single path in the exit of the merger module is typically only large enough to accommodate a single feedstock 200 and thus in order for one feedstock 200 to pass through the merger module 156, it may be required that all other feedstocks have been retracted to the minimum retract line as shown in FIG. 5A. This retraction can be accomplished by the input drive module 154, which has independent control over the positioning of each feedstock 200.

Figure 5B:
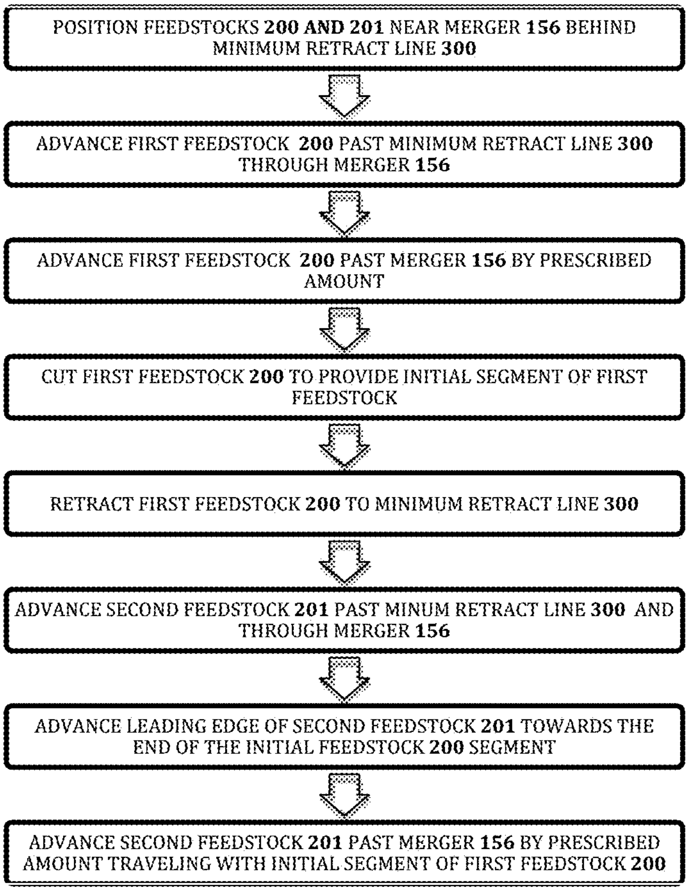
FIG. 5B is a flow chart illustrating an example of how a merger module can be used in conjunction with a cutter module to serially align a segment of first feedstock with a segment of second feedstock.

FIG. 5B is a flow chart illustrating an example process of how merger module 156 can be used in conjunction with a cutter module to serially align a segment of first feedstock with a segment of second feedstock. Example cutter modules 160 are described with reference to FIGS. 6A and 6B. As illustrated in FIG. 5B, the process of producing serially aligned segments of feedstock using a merger and a cutter can begin by positioning the first feedstock 200 and the second feedstock 201 near the merger 156 and at or proximal to the minimum retract line 300. Next, the first feedstock is advanced past a minimum retract line 300 and through the merger 156. The first feedstock is advanced past the merger 156 by a prescribed amount and cut with a cutter to provide an initial segment of first feedstock having a proximal end. The process continues by retracting the first feedstock 200 to the minimum retract line 300, advancing a second feedstock 201 past the minimum retract line and through the merger 156, advancing a leading edge of the second feedstock toward the proximal end of the initial segment of first feedstock, and advancing the second feedstock past the merger by a prescribed amount, the second feedstock traveling with the initial segment of the first feedstock. The second feedstock 201 may also be cut (not shown) with the cutter to provide a segment of second feedstock serially aligned with the initial segment of the first feedstock.

Returning to FIGS. 2A-2C, another feedstock detector 158 can follow the merger module 156 and may be used to determine the absolute position of each of the input feedstocks 200. This feedstock detector 158 can be similar in design to those shown in FIGS. 3A-3C and described above. One use for the feedstock detector 158 may be to determine the absolute position of each feedstock 200 using a process referred to as homing. In the homing process, one feedstock 200 will be driven towards the feedstock detector 158 using its respective input drive module 154 until the feedstock detector 158 detects the feedstock 200. Based on the known distance between the feedstock detector 158 and that input drive module, the controller will learn the absolute position of that feedstock 200. This process can be repeated for each of the feedstocks. When the feedstock detector 158 is strategically placed past the merger module 156, one feedstock detector 158 can be used for any number of input feedstocks. An alternative approach can be to use one feedstock detector 158 for each input feedstock prior to the merger module 156 while the feedstocks are still in parallel. This may allow for the homing of the feedstocks to happen concurrently rather than in serial as described above.

Figure 6A:
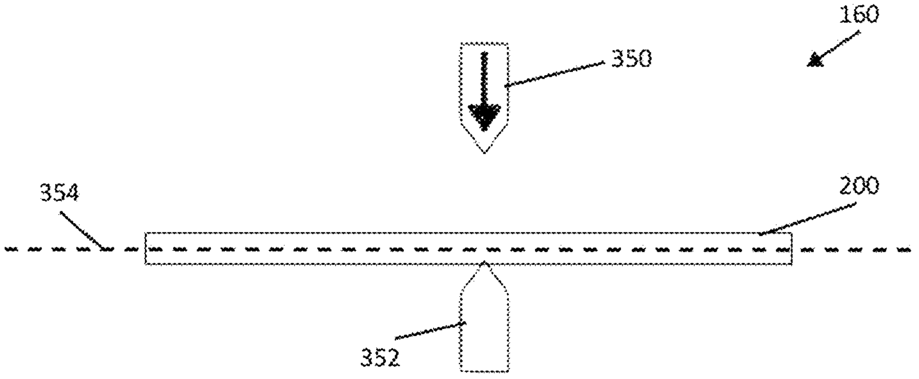
FIG. 6A shows a side cross section view of the cutter module 160 which in this example has a lower cutting blade 352 and an upper cutting blade 350 both positioned orthogonally to the central axis 354 of the feedstock 200.

The cutter module is responsible for parting/cutting the feedstock. FIG. 6A shows the cutter module 160 which in this example has a lower cutting blade 352 and an upper cutting blade 350 both positioned orthogonally to the central axis 354 of the feedstock 200. As can be seen in FIG. 6A, parting/cutting is accomplished by shearing the feedstock between sharp blade(s) 350 and 352 which are actuated by a mechanical solenoid or other method. It may be advantageous that the feedstock is cut orthogonally to the central axis of the feedstock as will be discussed during the description of the splicer module 162 below.

Figure 6B:
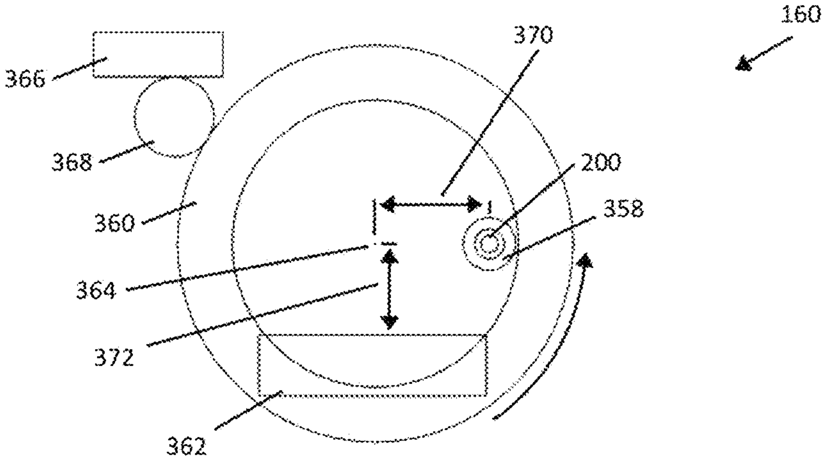
FIG. 6B shows a front cross section view of an alternative embodiment of the cutter module 160 which, in this example, has a cutting blade 362 affixed to a circular member 360 that is constrained to rotate in the plane of the page about the center point 364. The rotation of the circular member and blade assembly is controlled by the drive module 366 via a drive gear 368. The blade surface is a distance marked 372 from center point 364 while the feedstock's 200 centerline is a distance marked 370 from this point. The feedstock is constrained inside of a tube shaped member 358.

As an alternative, a rotary cutting module is presented as shown in FIG. 6B. In this example, a cutting blade 362 is affixed to a circular member 360 that is constrained to rotate in the plane of the page about the center point 364. The rotation of the circular member and blade assembly is controlled by the drive module 366 via a drive gear 368. As the assembly is rotated by the drive module 366, the blade can pass closely by the tube shaped member 358, thus shearing the feedstock that may be protruding from the tube 358 and effectively cutting/parting the feedstock. The end of the tube 358 may act as a cutting surface behind the blade as illustrated in the example of FIG. 6B, where the blade 362 can be considered to be located in the plane of the figure and the end of the tube 358 is positioned behind the plane. There may be another member similar to that of 358 on the other side of the blade to act as a second cutting surface and provide the feedstock a constrained path to travel through after passing through the cutter module 160. The blade surface is a distance marked 372 from center point 364 while the feedstock's 200 centerline is a distance marked 370 from this point. This distance 372 is preferably sufficiently less than that marked 370 to ensure the blade fully passes through the entire feedstock 200 to achieve a complete parting. With this rotary cutting system, as the blade engages the feedstock, it has both a sheering and sliding motion that has been shown to reduce the force required to cut the feedstock. By selecting appropriate distances 370 and 372, the rotary cutting system can be tuned to provide an optimized cutting process that may be lower impact, more efficient, and require a less powerful drive module 366. Other benefits of this system include its ability to be compact, rapid, and improve blade lifecycle through cutting with different parts of the blade by making cuts in both the clockwise and counterclockwise directions.

In an optional embodiment, a blade with a curved cutting surface may be used to further reduce the impact required to cut the feedstock. In another optional embodiment, the cutting medium may be heated to reduce the amount of force required to part the feedstock. In another optional embodiment the cutting module 160 may use a laser to cut through the feedstock as an alternative to a mechanically actuated blade.

Figure 7:
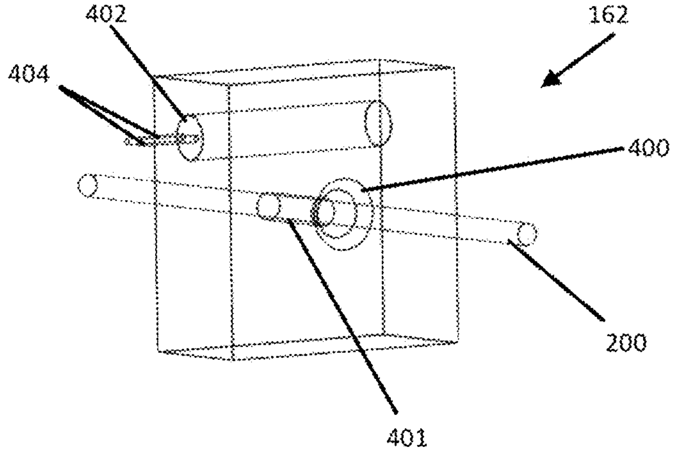
FIG. 7 shows one embodiment of the splicer module 162 which has a constrained passage with a tapered entrance 400 for the feedstock 200. The module may also have a heating element 402 built into it that may be controlled through the power inputs 404.

The splicer module 162 is responsible for fusing together segments of feedstock. This fusing process will be hereinafter referred to as splicing and the joins created as splices. This has been achieved using manual means, but it is believed that the method of automated splicing depicted in FIG. 7, as well as the alternative embodiments discussed later, are the first disclosure of their kind and are an improvement. FIG. 7 shows the splicer module 162 which has a constrained passage (e.g., channel) 401 with a tapered entrance 400 for the feedstock 200. The module may also have a heating element 402 built into it that may be controlled through the power input 404. The constrained passage may comprise any convenient material such as, but not limited to, PTFE, PC, PMMA, PEEK, or various metals, including metal alloys, A common class of feedstocks used with fused deposition modeling 3D printing at the time of this application is thermoplastics and thus the splicing of this material class will be discussed. It is to be noted that although the discussion here focuses on thermoplastics, this technology is not exclusive to this material class. In the SEME process disclosed herein the feedstock segments are spliced together to form a continuous feedstock that is able to pass into an extruder and thus the splices should exhibit enough mechanical integrity and geometric consistency to survive this process.

The input drive module(s) 154 will work in conjunction with the outgoing drive module 166 to position the discontinuity in the feedstock relative to the splicer module 162. For the purpose of this disclosure, the term discontinuity refers to the discrete position along the feedstock where the first feedstock segment meets the second feedstock segment. It has been found that the pressure between the mating surfaces at the discontinuity in the feedstock has an effect on the integrity of the splice and this can be controlled by the drive modules 166 or through a different method. Another factor which affects the integrity of the splice is how well the mating surfaces of both pieces of feedstock meet where ideally, the surfaces are perfectly parallel and have 100% contact. This is why it may be advantageous that the cutter module 160 is able to produce repeatable and orthogonal cuts as described above.

In one embodiment, the splicer module 162 as shown in FIG. 7 has a constrained passage 401 for the feedstock that will be in a range of between 0.1 mm and 100 mm in length. The splicer module 162 may have a heating element 402 built into it that is capable of heating up the module. The splicer module 162 may use heat and pressure to pass energy into this discontinuity in the feedstock to bond the sections. Heat may be used to increase the rate of diffusion within the thermoplastic feedstocks for causing crosslinking, and other phenomena to occur which bond the segments together. Although the splice can occur while the discontinuity in the feedstock is stagnant inside the splicer module 162, an alternative is a method hereinafter referred to as the 'drag seal' method where the feedstock moves continuously through the splicer module 162 by coordinated control of the incoming drive module 154 and outgoing drive module 166. The drag seal method may also include periods of stagnation or reversal where the feedstock is not moving inside of the splicer or moves in reverse, respectively. The drag seal method is an improvement to the stagnant method in that it prevents the feedstock from sticking to the inside surface of the splicer and creates a smooth external surface in the spliced region of the feedstock. One skilled in the art may recognize that discontinuities in the surfaces of members under load cause stress concentrations which can initiate crack propagation and lead to failure. It may be advantageous that the surface of the feedstock is smooth to ensure structural integrity, to prevent it from getting caught on anything on its way to the extruder, and to prevent it from getting jammed in the extruder. Furthermore, by dragging the material on the surface of the feedstock, the polymeric chains in each material will become aligned along the central axis of the feedstock which can lead to strengthening. It has been found that the materials in the splicer module that are in contact with the feedstock can have an effect on performance of the drag seal. The use of certain metals including but not limited to copper, stainless steel, aluminum, titanium, and brass may promote more of a drag effect while materials such as but not limited to polyacetal material, such as DELRIN, PMMA, PTFE, such as TEFLON, and polyethylene (PE) may be preferred in areas of the splicer where drag effects are not desired. Two or more different materials can be used in the splicer. In a preferred embodiment, an aluminum surface is used in the splicer for promoting the drag effect and a PTFE surface is used in other areas of the splicer where a drag effect is not desired.

It has been found that in order to achieve high quality, repeatable splices between segments of feedstock, the factors described above including, but not limited to, surface pressure of the mating surfaces, applied energy (heat), and drag seal velocity are preferably precisely controlled. Two properties of thermoplastics that add complexity to this situation is that they exhibit softening when the temperature of the material reaches the so-called glass transition temperature, as well as that they tend to expand when they reach elevated temperatures. This glass transition temperature is below the melting temperature of the material (defined as the melting temperature of the crystalline state of the material) and in some cases it can be significantly lower. This may represent a processing challenge as the softened material loses a lot of its rigidity, meaning the actuation of the feedstocks by the incoming drive modules 154 and outgoing drive modules 166 may not be able to achieve the desired actuation of the softened regions.

Figure 8A:
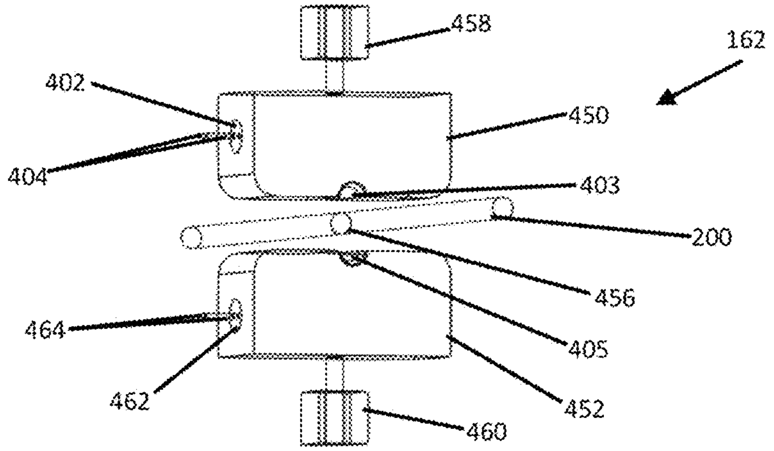
FIG. 8A shows an alternative embodiment of the splicer module 162 which comprises an upper block 450 and a lower block 452. Upper actuator 458 controls the position of the upper block 450 while lower actuator 460 controls the position of the lower block 452. The feedstock 200 that may have a discontinuity 456 in it will pass between the sections of the splicer module 162. Each of the sections may also have a heating element 402 or 462 built into it that may be controlled through the power inputs 404 or 464.

Furthermore, the expansion of the feedstock can cause increased pressure between the feedstock outer surface and the constrained surfaces of the splicer or other components of the SEME module 102 which can lead to jamming. This can become a significant issue when the flow of feedstock through the SEME system pauses, and the temperature of the feedstock in the splicer module rises significantly. The proposed solution to this problem is to use a multi-section splicing die which is able to open and close. For ease of illustration, a two part die will be used. This die is divided into two parts, e.g., two halves, as shown in FIG. 8A, although it should be noted that any number of sections (e.g., blocks) may be used divided in any proportions. It should be further noted that each section (e.g., block) of the die may be composed of different materials to optimize thermal, and drag seal characteristics as described previously.

The non-limiting, alternative embodiment shown in FIG. 8A shows the splicer module 162 which comprises an upper block 450 defining an upper surface 403 and a lower block 452 defining a lower surface 405. The actuator 458 controls the position of the upper block 450. The actuator 460 controls the position of the lower block 452. The feedstock 200 that may have a discontinuity 456 in it will pass between the sections (e.g., between the upper and lower surfaces 403 and 405) of the splicer module 162. Each of the sections may also have a heating element 402 or 462 built into it that may be controlled through the power inputs 404 or 464.

The two part die can be actuated electromechanically to ensure that the splicer is only active (and in contact with feedstock) when splicing needs to take place. Each section of the die may be actuated independently as required by the system. The temperature of each die section may be controlled independently allowing for parts of the cross section of the feedstock to be heated for splicing while another section(s) may be maintained at a lower temperature. By maintaining a portion of the cross section of the feedstock at a lower temperature, preferably below the glass transition temperature of the material(s) being spliced, there may be adequate rigidity maintained, allowing for better processing control. The lower temperature die part(s) may be cooled by standard means, may be maintained at ambient temperature, or may be heated. This disclosure may provide a significant improvement where the cross section of the feedstock is processed non-uniformly as it allows for improved control that can lead to higher quality output.

The multi-section die method described above may result in the feedstock having properties that are not uniform, and may require subsequent splicing operations in other orientations. In a simple example, the feedstock may pass from the initial splicer module into a second splicer module that is rotated 180 degrees about the central axis of the feedstock, allowing the previously spliced section(s) of the cross section to this time act as the rigid sections, while the rigid sections in the prior splice can now be heated and spliced. This method is not limited to one or two splicer modules and may use any number where each may be different and there may be a feedstock quality management module 164 (hereinafter abbreviated to FQMM) following each splicing activity in the splicer module.

The process of splicing together segments of feedstock has several controllable factors including the feedstock travel rates, feedstock pause times, splicer section temperatures, splicer opening and closing rates, etc. Many factors can be controlled directly by the SEME module's controller allowing the sequence of splicing to be pre-programmed and repeatable. The following is a description of an exemplary splicing process.

Figures 8B, 9A:
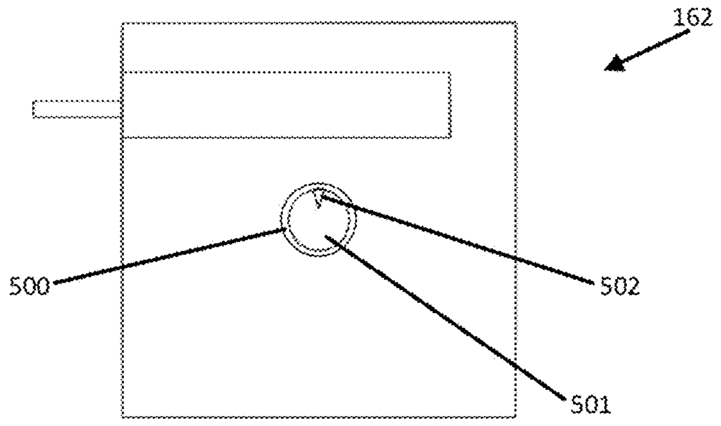
FIG. 8B is a flow chart of an example splicing process.
FIG. 9A shows a front view of an embodiment of the splicer module 162 with an entrance 500 for feedstock that has a member(s) that protrudes from the inside of the constrained surface 502.

FIG. 8B is a flow chart of an example splicing process using the splicer 162. To prepare for the splicing sequence, the ingoing and outgoing drive modules 154 and 166 respectively can be used to position the discontinuity in the multicomponent feedstock near the entrance to the splicer 162. The lower block 452 may be positioned in contact with the feedstock and maintained at a temperature below the glass transition temperature of the segments being spliced. The upper block 450 may be maintained at an elevated temperature above that of the melting temperature of the materials being spliced. To initiate the splicing sequence, the upper block 450 may lower down into contact with the feedstock. The discontinuity 456 may then be passed into the splicer through coordinated forward motion of the ingoing and outgoing drive modules 154 and 166 respectively. The discontinuity may then be held in place for several seconds inside the splicer 162 to allow energy to transfer into the feedstocks. While the outgoing drive module 166 remains fixed, the ingoing drive module 156 may actuate the following feedstock in towards the splicer causing for a compression force at the discontinuity. The ingoing drive module 156 may then reverse the following feedstock away from the splicer releasing the compression force. The ingoing and outgoing drive modules 154 and 166 respectively may then position the discontinuity back and forth through the splicer several times to agitate the spliced region leading to a better bond. The upper splicer block 450 may then open up as the discontinuity is moved past the splicer into the FQMM 164. There may be pauses between each of the steps in the sequence. It should also be noted that although the steps are described in series they may occur in parallel. For example, in the beginning of the splicing sequence described above, the discontinuity 456 may be passed into the splicer 162 while at the same time the upper block 450 is closing.

In a preferred embodiment, TEFLON (PTFE) and aluminum materials are used in the splicing method and associated device. The splicer module is separated into two halves (e.g., blocks), similar to the splicer shown in FIG. 8A. A first block of the splicer is a PTFE material and is permanently positioned in contact with the feedstock that travels past it. Therefore, this part of the splicer does not actuate away from or into contact with the feedstock. The PTFE material is not heated or cooled, but is kept at the ambient temperature. The surface of the PTFE block that contacts the feedstock is smooth. Based on this smooth surface and the material properties of the PFTE material, the feedstock does not stick to the PTFE part of the splicer. This is so whether the feedstock is in a solid or a molten liquid state. This means that this part of the splicer does not promote a drag seal effect as it does not drag any material. Instead, the feedstock slips off it and past it with minimal friction. Since the first block, or at least the surface of the first block in contact with the feedstock, is at ambient temperature, the feedstock in contact with the first block is kept at or near ambient temperature, which is generally below the glass transition temperature of the feedstock. Thus, the portion of the feedstock facing the first block is maintained in a sufficiently rigid state. Above the glass transition temperature, the feedstock can be very soft and difficult to control.

The other part of the splicer, e.g. the second block, is made from aluminum. It is heated by a cartridge heater similar to the heater 402 shown in FIG. 8A. The second block is able to swing into contact with the feedstock by a motor under control of the SEME module's controller. When this hot section of the splicer makes contact with the feedstock, it transfers heat into the feedstock causing it to quickly melt. The molten feedstock tends to stick to the surface of the aluminum that contacts the feedstock. This is what is believed to promote the drag seal effect to take place on this half of the splicer. Material from the first feedstock segment sticks to this aluminum and, as the discontinuity in the multicomponent feedstock is passed forward, the stuck-on material is pulled back over the second, adjacent feedstock segment. If the hot part of the splicer were made from PTFE, feedstock may not stick to this part of the splicer. Preferably, the aluminum does not have a polished finish; otherwise the molten plastic may not sufficiently stick to it. Without subscribing to a particular theory, it is believed that the texture and material properties of the aluminum surface contacting the feedstock aid with the drag seal process. Materials other than aluminum may be used, such as steel, brass, copper, and the like. In this method of splicing, the ability of the splicer to open and close is useful so that the splicer is preferably only melting and dragging material during a splice. Further, the use of different materials, e.g., one material that drags feedstock and one that does not, is advantageous.

Figure 11:
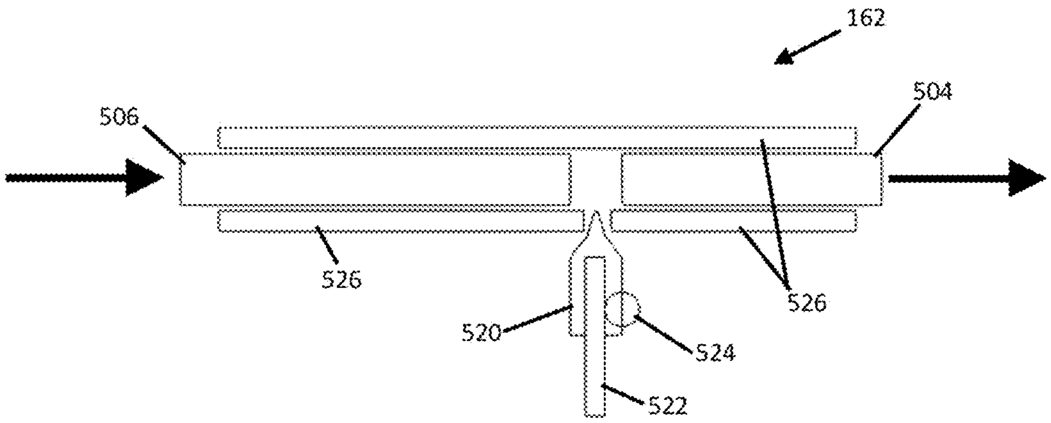
FIG. 11 shows a side cross section view of an alternative splicer module 162 comprising a housing 526 that has a channel in its side for an extruder nozzle 520. The extruder nozzle comprises an adhesive feedstock 522 and an actuator 524. In this representation, the nozzle 520 is positioned between a leading segment of feedstock 504 and a following segment 506 each constrained by the housing 526.

Several alternative splicing methods will be described below. It is important to note that all of these methods including those described above may exist in a simplified form or may be utilized as a drag seal method or multi-section die method as described above to allow for similar benefits to be realized with these methods. An alternative splicing method referred to as the injection adhesive method is shown in FIG. 11 where the splicer module 162 comprises a housing 526 that has a channel in its side for an extruder nozzle 520. The extruder nozzle may comprise an adhesive feedstock 522 and an actuator 524. This adhesive feedstock 522 may be a resin, glue, wax, thermoplastic, thermoset, colorant, or any other material either identical to or different from the feedstock being processed through the splicer module 162. Although a single extruder nozzle 520 is shown in FIG. 11, the system may contain a plurality of similar or different extruder nozzles at different locations in the splicer module 162. This feedstock 522 may be in solid, liquid, or gas form and is only represented as a solid similar to the feedstock 504 and 506 for simplicity. The actuator 524 is responsible for controlling the deposition of the adhesive feedstock as prescribed by the controller. In FIG. 11 the extruder nozzle 520 is positioned between a leading segment of feedstock 504 and a following segment 506 where there may exist a gap in the discontinuity between the segments of feedstock. With the intention of bonding the segments together or locally changing the properties of the feedstock, the system may deposit adhesive feedstock into the housing 526. This adhesive feedstock may be deposited onto, between, or in any other location relative to the housing 526 and feedstock segments 504 and 506. The temperature of the adhesive feedstock may be controlled to allow for better diffusional bonding, to facilitate curing, or for any other thermal benefits.

The use of an adhesive feedstock in the splicing system is an improvement over other methods as it introduces a new substance that can have tailored properties to help achieve a desired outcome. For the use of two feedstocks that would not be able to bond adequately using simple thermal processes, for instance, an adhesive feedstock could be selected that would appropriately allow for them to bond using other means.

In a special case, the adhesive material 522 may be what is referred to as a "cleaning feedstock" which is used in extrusion processes to help clean and purge material from the inside of extruders. This is beneficial for the overall SEME process as it allow for more rapid transition from one material to the next when a new material is passed into an extruder.

Another benefit of the adhesive injection method is that, as described, it can be used for more than injecting adhesives for the purpose of bonding feedstock segments. It can be used to inject materials that allow for the feedstock to take on new properties such as color, electrical conductance, magnetic polarity, or any other property. Such properties could be applied to feedstock locally or in a continuous fashion as the feedstock passes through the splicer module 162.

It can be understood that for splicing to occur, energy may need to be applied to the region of the material(s) to be spliced allowing for the bonding to occur. Although the direct heating described above has been proven effective, there are several alternatives to achieve this energy such as the use of ultrasonics, optical elements (laser, LED, etc.), or the like. By imparting ultrasonic energy into the feedstock segment to be spliced, in conjunction with adequate pressure on the surfaces to be spliced by the input and output drive modules, the segments of feedstock can be spliced. An advantage of this method is that the ultrasonic process is well understood and can be fine-tuned based on the generator controlling the ultrasonic module(s). Furthermore, this method leads to less local heating which is advantageous to ensure quality of the feedstock as discussed previously.

Alternatively, laser energy can be used where the laser is focused on or near the discontinuity in the feedstock, which similarly, when combined with adequate pressure on the surfaces to be spliced by the ingoing and outgoing drive modules, allows the segments of feedstock to be spliced. Laser energy is not limited to wavelengths in the visible spectrum and may include the use of electromagnetic radiation in the spectrum from microwaves to ultraviolet. It may be optimal to have an energy source tuned to be near the characteristic absorption peaks of the feedstocks being processed. A plurality of energy sources may also be required to allow for the application of energy from different areas around the feedstock being processed. The advantages of this method are similar to those of the ultrasonic method in that it can be better controlled by the generator powering the laser or other energy source such as but not limited to a light emitting diode (LED). With appropriate tuning and focusing through lenses or other means, these sources are able to focus on very small regions (with respect to the size of the feedstock). Thus they can act to add energy to the spliced region through the middle of the feedstock. The energy can dissipate towards the outside leading to more isotropic properties, which may be preferred.

Figure 9B:
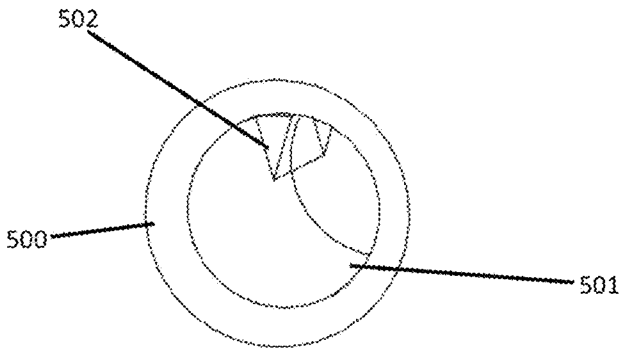
FIG. 9B shows a magnified three-dimensional view of the entrance 500 for feedstock into the splicer module 162 of FIG. 9A with a member(s) that protrudes from the inside of the constrained surface 502.

When energy is added to the region of feedstocks to be spliced using any of the methods described previously, one skilled in the art may recognize that the desired bonding relies partially on diffusional processes within the feedstocks that create this bond. For the case of thermoplastics being spliced together it is possible that the two materials may form a block copolymer via copolymerization leading to strong covalent bonding. For other materials however, copolymerization and other potential bonding mechanisms are not possible and thus chemical bonding is not a viable splicing solution. A method is disclosed herein to overcome this limitation that creates a mechanical bond to mend the discontinuity in the feedstocks being spliced. This method, hereinafter referred to as the 'hot knife method' shown in FIGS. 9A and 9B comprises the simple splicing set up shown in FIG. 7 with the addition of one or more members that protrude into a constrained passageway (e.g., channel) on the inside of the splicer. For simplicity, only a single protruding member is shown although there may be any number (including, if desired, a very large number) leading to different surface properties and textures. More particularly, FIG. 9A shows a front view of the splicer module 162 with an entrance 500 for feedstock that has a member(s) that protrudes from an inside surface of a constrained channel 501. FIG. 9B shows a magnified 3 dimensional (3D) view of the entrance 500 for feedstock into the splicer module 162 with a member(s) 502 that protrudes from the inside surface of the constrained channel 501. Optionally, the member(s) 502 can be actuated to move in and out of the channel 501. In one example, the member(s) 502 is heated and may be actuated into the channel 501 when a discontinuity of the feedstock is positioned within the channel. The member(s) 502 can also be used in combination with the multi-part die 450, 452 of the splicer module 162 of FIG. 8A.

These member(s) 502 may interfere with the path of the feedstock passing through the constrained channel in the splicer module 162 causing the feedstock to partially flow around and/or partially be dragged by these protrusions. This mechanism will achieve a mechanical connection between the segments to be spliced by dragging material from the first material to pass through, back into and/or around the second material as shown in FIG. 9C.

Figure 9C:
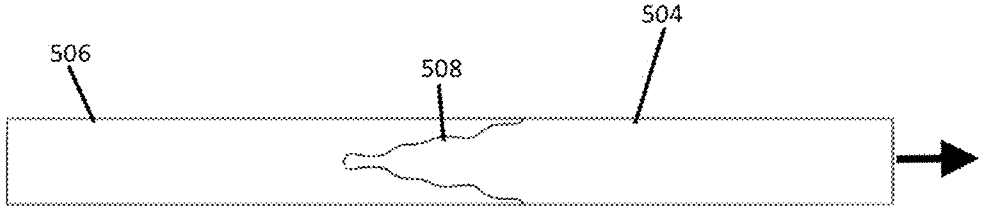
FIG. 9C shows a side view of feedstock with a mechanical connection 508 formed by material from the leading segment of feedstock 504 being dragged back into the following segment of feedstock 506 to illustrate the hot knife method.

FIG. 9C shows a side view of feedstock with a mechanical connection 508 formed by material from the leading segment of feedstock 504 being dragged back into and/or around the following segment of feedstock 506 to illustrate the hot knife method. This process may cause the materials to become mechanically intertwined (e.g., meshed) and thus achieve the desired splicing effect. This is advantageous as it can allow dissimilar materials to be connected together and can be especially beneficial when other bonding methods such as chemical bonding are not possible. This hot knife method may also be implemented as a modification to the multipart die method and drag seal method described above to achieve the same benefits over the simple splicing method.

The FQMM is responsible for ensuring that the feedstock is of adequate quality to move forward in the SEME process and survive the rest of the process towards the extruder. Two major desired outcomes of the FQMM are to: ensure that the feedstock has a smooth uniform cross section and ensure that the feedstock is thermally stable. As discussed previously, the drag seal method is an effective solution for ensuring the feedstock has a smooth outer surface although with the introduction of a multi-section splicing die, it is possible that “flashing” may form between the mating sections of the splicing dies. The term “flashing” refers to the material that may escape from molding cavity(s) between the sections of mating parts in the mold that may form thin protrusions from the body of the part. Further, based on the movement of material from different parts of the feedstocks occurring through the hot knife, drag seal, or any other process, it is possible that the resultant discontinuity region may have voids or divots where material is missing. That is, if material is displaced from a forward position to a following position, there may be a consequent lack of material at said forward position. It has been found that passing the feedstock directly from the splicer module into a constrained passageway that tapers down to a cross section close in size to that of the feedstock can be effective at smoothing out any protrusions from the feedstock surface. Furthermore, the constrained passageway can act as a mold or forming cavity to repair any voids or divots that may be present. In one example, this may be achieved by using the ingoing and outgoing drive modules to first position the discontinuity inside of the constrained passageway. Next the drive modules could apply axial compression to the feedstocks to promote the formable material near the discontinuity to expand out to conform to the shape of the passageway, effectively filling in any voids or divots.

Another method is to pass the feedstock through two or more roller wheels that have a cross section similar to that of the feedstock, which can similarly smooth out protrusions from the feedstock surface. In both cases it is useful to ensure that the materials these components are made from have both good thermal conductivity properties and low coefficients of friction, where these materials can be, but are not limited to, copper, aluminum, brass, steel, PTFE, or PMMA. The constrained passageway method and the roller wheel method are shown in FIGS. 10A and 10B, respectively.

Figure 10A:
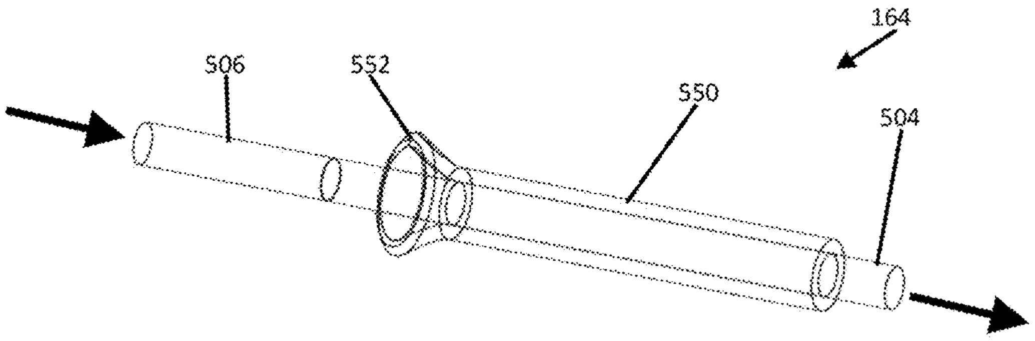
FIG. 10A shows an isometric view of an example constrained passageway 550 inside of the FQMM 164. The constrained passageway 550 has a tapered entrance 552 that the leading feedstock segment 504 may enter followed by the following feedstock segment 506 in the direction indicated by the arrows.
Figure 10B:
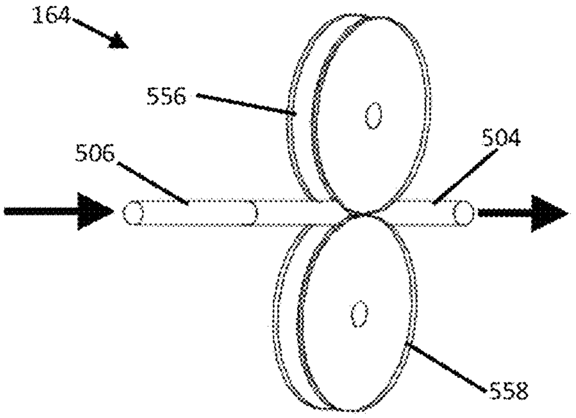
FIG. 10B shows an isometric view of an example FQMM featuring upper roller wheel 556 and lower roller wheel 558. The leading feedstock segment 504 passes between the roller wheels 556, 558 followed by the following feedstock segment 506 in the direction indicated by the arrows.

FIG. 10A shows an isometric view of the constrained passageway 550 inside of the FQMM 164. The constrained passageway 550 can have a tapered entrance 552 that the leading feedstock segment 504 may enter followed by the following feedstock segment 506 in the direction indicated by the arrows. FIG. 10B shows an isometric view of the FQMM featuring upper roller wheel 556 and lower roller wheel 558. The leading feedstock segment 504 passes between the roller wheels 556, 558 followed by the following feedstock segment 506 in the direction indicated by the arrows.

To ensure that the feedstock is thermally stable it is advantageous to control the cooling of the feedstock which may have been heated during splicing. This can be achieved by controlling the travel length and time between the splicer modules and the outgoing drive modules as well as the heat transfer in this region. For the constrained method, the material constraining the feedstock may be cooled by free convection, forced convection, Peltier cooling, liquid cooling, or any other means of removing heat. For the roller wheel case, the roller wheels, as well as the exposed feedstock, may similarly be cooled using free convection, forced convection, Peltier cooling, liquid cooling, or any other means of removing heat.

The outgoing drive module 166 (FIG. 2A) is responsible for controlling the linear position of the feedstock leaving the SEME module 102. The outgoing drive module 166 provides utility in that, when controlled with respect to the input drive modules 154, it can create axial pressure within the feedstock between them, which, as described previously, is beneficial. Furthermore, by controlling the outgoing feedstock independently from the ingoing feedstock, the system retains better control over the feedstocks mitigating the issues that may occur if the outgoing feedstock was uncontrolled and susceptible to applied forces downstream of it. The outgoing drive module 166 is substantially identical to the input drive module 154 shown in FIG. 4. This includes the ability to have a feedstock sensor 152 embedded within the drive module 166 or placed before or after it. As mentioned, a feedstock sensor 152 can be used to indicate to the controller whether the feedstock 200 is present, its rate and distance travelled, and certain properties of the present feedstock. It is useful for the controller to be able to know this information about the feedstock present at this stage in the SEME process in order to provide accurate closed loop feedback which can be useful for, but is not limited to use for enhancing performance, detecting failures, and for calibration.

There are many optional features of the SEME technology which may enhance the quality of its function as well as offer standalone utility. Several of them will be discussed below including the feedstock buffer, feedstock monitoring device (e.g., scroll wheel), and diverter designs at the hot-end useful for purging, transition management, or the like.

It is known that fused deposition modeling 3D printers may process/consume feedstock at varying rates during a given printing process. Ideally, the SEME process disclosed herein preferably processes feedstock at the identical rate to the 3D printer consuming it, although this is difficult for two main reasons. Firstly, the SEME process has several steps which may be rate dependent such as the splicing process where feedstock passes through the splicer module(s) 162 at a prescribed rate in order to achieve adequate splices. Secondly, it is known that fused deposition modeling 3D printer extruder drive modules commonly ‘skip’ or momentarily lose grip of the input feedstock while printing which leads to the 3D printer processing a different amount of feedstock than originally specified based on the computer program controlling it.

As such, the present disclosure provides a feedstock buffer which includes a region between the output of the SEME module 102 and the input into the 3D printer extruder that acts as a buffer to accommodate a mismatch in feedstock consumption and production. In the case that the feedstock is partially unconstrained between the SEME module 102 and the 3D printer extruder this may be achieved by leaving ‘slack’ in the feedstock that allows it to expand and contract by a given amount without fracturing. A specific solution to this for spooled feedstock is to leave one or more unconstrained loops which are able to expand or contract based on the relative speed of the 3D printer consuming the feedstock and the SEME module 102 creating it.

Figure 14A:
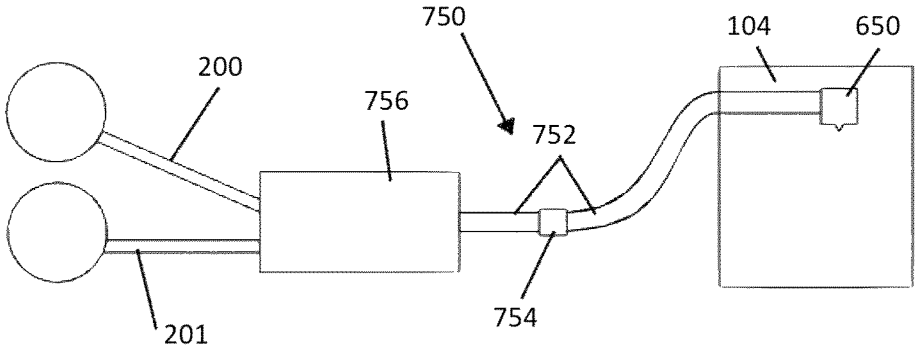
FIG. 14A shows a use case for SEME technology where one or more spool(s) of feedstock 200 and 201 pass into SEME module 756. The multicomponent feedstock output of the SEME module 756 passes into the 3D printer 104 via expandable constrained passageway 750. An example implementation of the expandable constrained passageway 750 includes two constrained tubes 752 connected by a coupler 754 that may have elastic properties.
Figure 14B:
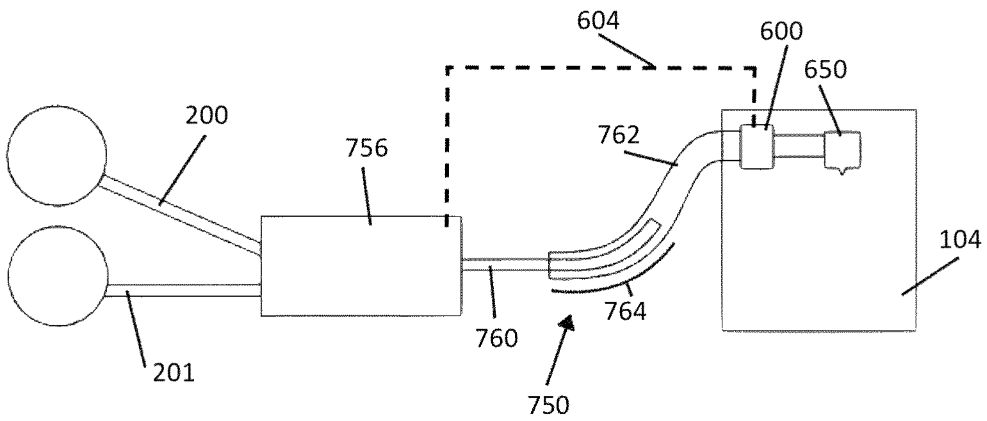
FIG. 14B illustrates an example buffer system between the SEME module 756 and the 3D printer 104 including telescoping tubes.

It may be preferable, however, to have a constrained or partially constrained path between the SEME module 102 and the 3D printer extruder, in which case other methods can be used for creating an effective buffer. The constraint for the feedstock may be a hose, tube, or other element that is able to constrain feedstock travel and will hereinafter be referred to as the ‘constrained buffer tube’, one example of which is shown at 752 in FIG. 14A. Another example is illustrated in FIG. 14B. The constrained buffer tube also protects the feedstock as it travels to the 3D printer, e.g., it can prevent the feedstock from kinking or tangling.

It has been shown that by dividing the constrained buffer tube 752 into two or more segments where one may be able to pass into or over the other to form a telescopic mechanism, a sufficient buffer can be created. That is, a portion of a smaller diameter constrained tube is inserted within a portion of a larger diameter constrained tube and the two tubes move telescopically relative to each other during intake and extrusion of feedstock. In this example, when the buffer needs to contract, the constrained buffer tubes will accommodate this by having one travel inside of the other to effectively shorten the constrained tube system without affecting the feedstock inside of it. Conversely, for the buffer to expand, the constrained buffer tubes 752 may spread apart with respect to each other effectively lengthening the constrained tube system but not affecting the feedstock inside. It may be preferential to use low friction materials for the buffer system such as but not limited to PMMA, PE, polypropylene (PP), polyvinyl chloride (PVC), PTFE, or acrylonitrile butadiene styrene (ABS). This system may also achieve a similar effect without the requirement for a telescopic mechanism where different segments of constrained buffer tube 752 expand and contract with respect to each other, creating gaps when they expand and closing gaps when they contract.

FIG. 14B illustrates an example constrained buffer system between the SEME module 756 and 3D printer 104 including telescoping tubes. The telescopic buffer system illustrated in FIG. 14B can be used in any pre-extrusion feed system, such as, for example, SEME, and provides several advantages compared to a standard feed constraint system. The telescopic constraint system between the SEME module 102 and the 3D printer's extruder 650 allows for the constrained length to be variable.

Figure 14C:
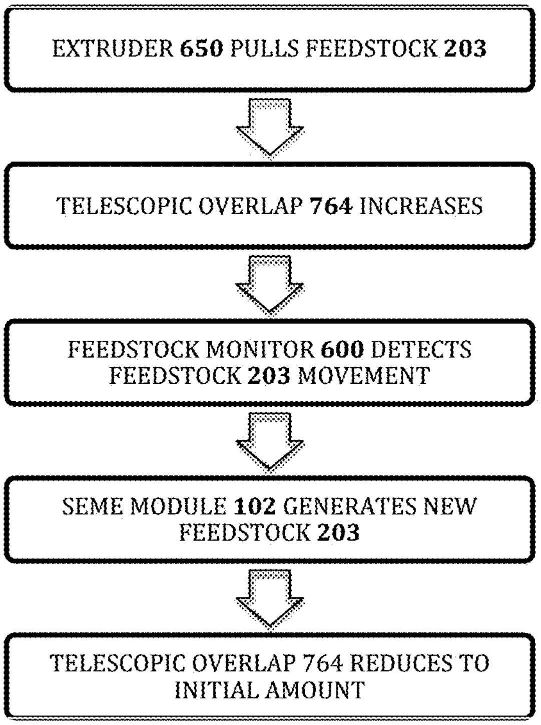
FIG. 14C is a flow chart illustrating an example process of buffering using a telescoping buffer system.

FIG. 14C is a flow chart illustrating an example process of buffering using the telescoping buffer system of FIG. 14B. The process may begin with a certain amount of overlap 764 between the tubes 760 and 762 that may be considered the buffer system's neutral state. Note that it is assumed that feedstock is sufficiently held fixed inside of both the SEME module 102 and extruder 650 unless the feedstock is being actuated by their respective controllers. As the extruder 650 pulls feedstock 203 in, the length of feedstock between the extruder and the SEME module 102 will decrease and thus require the constrained buffer region to decrease in length. In this case, the overlap region 764 will increase in length as inner tube 760 moves further inside of outer tube 762. During this action, feedstock will travel inside of the feedstock monitoring device (e.g., scroll wheel) 600 and outer tube 762 but will remain stationary with respect to the inner tube 760 as the SEME module holds the feedstock fixed. In this case, the extruder is able to consume feedstock despite the SEME module not producing any feedstock illustrating how the buffer system is able to decouple the consumption and production rates of feedstock. Similarly, when the SEME module 102 generates multicomponent feedstock 203, the feedstock will move with respect to inner tube 760 but will not cause feedstock to move inside of the outer tube 762 or scroll wheel 600. This will cause the inner tube 760 to move inside of outer tube 762 decreasing the overlap region 764 back to the neutral state. This illustrates how the buffer system is able to isolate feedstock generation from the SEME module 102 allowing the scroll wheel 600 to only register motion of feedstock as it is consumed by the extruder 650. The scroll wheel 600 passes this extruder 650 feedstock consumption information to the SEME module 102 via cable 604 to ensure that the SEME module 102 can replenish the buffer in an attempt to keep it in its neutral state 764.

In the example described above, the buffer system is maintained indirectly by comparing the amount of feedstock consumption as measured by the scroll wheel 600, with the feedstock production of the SEME module 102. The buffer system may alternatively be maintained by measuring the amount of buffer overlap 764 directly using a linear encoder or the like. For example, a feedstock monitor that can track the size of the buffer may be positioned between the feedstock source, e.g., the SEME module 102, and the extruder 650. The buffer system may also have physical stops or a spring built into it to limit the range of motion of the telescopic mechanism.

An alternative solution is to control the position of the output of the SEME module 102 with respect to the 3D printer ensuring the feedstock is maintained under a reasonable tension and thus no substantial buffer may be required.

In order for the SEME module 102 to produce feedstock at a rate that matches that of the 3D printer, it is useful to know the rate at which the 3D printer is consuming feedstock. This information can in theory be extracted from the data file that controls the printer (hereinafter referred to as the 'control code'), although one skilled in the art may recognize that at the date of this application, feedstock consumption is often not equal to that predicted by the control code. Variability is introduced by factors including the hardness and diameter of the feedstock being extruded, geometric variability within the extruder driver modules in 3D printers, as well as many other factors.

Rather than using the control code directly, an alternative solution is to extract the data from the electromechanical systems which control the 3D printer's extrusion. Data may be extracted through invasive or non-invasive means. For example, this collection may be achieved by reading and interpreting the electrical signal sent to the 3D printer extruder motors in order to determine how much material the motors will extrude over a given period of time. These readings may be used by the SEME module's controller in conjunction with the control code to track the 3D printer's progress through the control code in what is hereinafter referred to as a 'tracking process'.

As discussed previously, although these two proposed solutions allow for the SEME module to monitor theoretical feedstock consumption, the open loop feedback systems on most 3D print extruders are not accurate enough for this theoretical consumption to match real consumption over time. A second drawback of these approaches is recognized when considering the use of SEME technology as an external retrofit, in that many fused deposition modeling 3D printers are designed differently and use different types of electromechanical components and thus it may be difficult to ensure compatibility with these solutions.

An alternative method is described below wherein feedstock monitoring is used. In certain embodiments, a feedstock monitoring device comprises a "scroll wheel". This feedstock monitoring solution not only ensures reliable rate matching but is also more universally compatible with fused deposition modeling 3D printers. This disclosure provides a device which is placed in line with the feedstock entering (or inside) the 3D printer that is able to monitor the movement of the feedstock. This device is substantially the same as that shown in FIG. 3C where the movement of feedstock is encoded for use by the controller. In an embodiment, the drive gear 606 and idler wheel 608 of the device are identical in size and material, similar to the roller wheels shown in FIG. 10B. In the case that the 3D printer has this type of sensor already built into it, then the data from this already built-in scroll wheel system may be equivalently used.

As in any measurement system, it is desirable for a feedstock monitoring device, e.g., the scroll wheel, not to change the medium being measured as the measuring process takes place. Using rigid roller wheels in the monitoring device may cause the feedstock to be compressed and, thus, lengthened as the feedstock passes through the device. Using non-rigid roller wheels, such as those made from materials that exhibit elastomeric properties, can increase the likelihood that the feedstock is unaffected as it passes through the roller wheels.

For the scroll wheel to achieve a more accurate reading of feedstock travel, it is preferred to reduce and possibly eliminate slip between the feedstock and the roller wheels. To this end, it may be advantageous to use a material with sufficient elasticity to grip the feedstock, such as rubber or polyurethane. It is also preferred that the wheels are able to rotate with little rotary friction. This can be achieved by using low friction bearings. Furthermore, a symmetrical arrangement of the roller wheels (e.g., geometry, size, and/or composition) is particularly useful. For example, identical composition of the wheels can obviate an asymmetrical effect of temperature on the roller wheels.

The scroll wheel can measure the actual feedstock consumption of the 3D printer, which enables the SEME module to match or otherwise respond to the actual/true feedstock consumption and not the theoretical consumption that may be less accurate. Furthermore, this actual feedstock monitoring using the scroll wheel may be used in conjunction with the control code to track the printer's progress, allowing for a more accurate tracking process. Discrete events hereinafter referred to as 'pings' may be added or isolated in the control code that the controller may use to compare the scroll wheel data to. For example, a ping sequence may be inserted into the control code to cause the 3D printer to pause for 10 seconds, pull feedstock for 5 seconds, and then pause for 5 seconds. This ping sequence can be detected as a corresponding signature in the movement of the feedstock.

In a particular implementation, the SEME module is electronically connected (i.e., via wired or wireless connection) to the 3D printer so that two-way communication can occur. When implementing SEME technology as a standalone accessory to be used with a 3D printer, however, it may be difficult to establish such a connection. However, it is convenient to employ "pinging" that allows the printer and the SEME module to communicate. One way to implement pinging is by inserting a signature into the feedstock consumption of the printer, such as a high-low-high sequence described elsewhere herein (see, e.g., Example 3). This is an elegant solution because it requires no extra sensor in addition to the feedstock monitor that is already employed.

There are other ways to ping between the 3D printer and the SEME module. One example is to install a switch at the printer that can be contacted by the print head. The switch can be small so that it can be easily fitted to any printer and not interfere with the print process. For the printer to ping in this case, a ping sequence can be programmed that causes the print head to move to and actuate the switch.

In the case where the 3D printer extruder feedstock consumption strays from the theoretical consumption dictated by the control code, so called "corrective actions" can be taken where the SEME module compensates for the difference, in order to bring the system back into synch. For instance, if the scroll wheel detects that the 3D printer has used 100.0 mm of feedstock but through its tracking sequence determines that at that point in the control code, the printer theoretically should have consumed 101.0 mm of feedstock, then it can calculate that the 3D printer is under extruding by roughly one percent. It can then use this to take corrective action and calibrate the SEME module to produce feedstock lengths that are scaled down by roughly one percent to not only correct for the 1 mm offset, but also to ensure that the error does not continue to grow. Through learning algorithms it has been shown that the controller can track error data and through statistical analysis fine tune control settings to minimize such error in the system.

It is to be noted that for fused deposition modeling 3D printing with multiple feedstocks, particularly through a single nozzle, an error between when the discontinuity between feedstock segments reaches the 3D printer extruder nozzle and when the control code theoretically predicts that it reaches the nozzle can lead to low quality printing. For instance, if the discontinuity between red and white thermoplastic feedstocks is required to reach the nozzle at 45 seconds into the printing process but instead reaches the nozzle at 46 seconds then this means that from the 45th to 46th second when the nozzle should have begun extruding the following feedstock (e.g., red thermoplastic), it would have still been extruding the leading feedstock segment (e.g., white thermoplastic). In this case the 3D printer would deposit the wrong feedstock into the printed part which may constitute a low quality print and even printing failure.

When considering the initial loading of the 3D printer with feedstock at time zero, it is desirable to load the leading edge of the first segment of feedstock the correct length into this extruder. If this loading length is not correct then the position of the discontinuities will be out of synch from where the control code will expect them to be which could cause low quality or even incorrect print. The scroll wheel can be used to determine how far the feedstock was loaded into the 3D printer's extruder, and this can be compared to how far it should have been loaded allowing for corrective action to be taken. This is a significant improvement over simply relying on accurate loading as this solution can compensate for a degree of human error that would have otherwise likely led to a failed print.

Since the SEME module produces feedstock upstream of the 3D printer's extruder, there may be a delay between when the controller takes corrective actions and when these corrections will be realized at the 3D printer's extruder nozzle. To account for this, a concept hereinafter referred to as the 'transition tolerance' may be used in order to create an amount of feedstock before and after the point when each theoretical discontinuity should arrive at the 3D printer's extruder nozzle with which the actual discontinuity may arrive at the nozzle and not cause the print to fail. For example, if this transition tolerance is 5 mm then the discontinuity may arrive at the nozzle up to 5 mm early or 5 mm late from when the control code expects it to arrive at the nozzle and will not cause the print to fail. This transition tolerance can afford the system enough time to take corrective action. This is a highly beneficial advance in the technology as it allows the system to be more reliable and robust. Without this advance, a print may be of lesser quality, and possibly incorrect, as a result of any event that causes the theoretical and actual feedstock consumption to vary and as discussed this is a very common occurrence. The scroll wheel technology described herein may be applied to processes, including extrusion processes, other than 3D printing.

Regarding corrective actions, there are at least two main ways that these can be implemented in the system which are: to alter the feedstock production by the SEME process or through alterations in the 3D printer control code. For a simple case where, based on the scroll wheel readings, the controller determines that discontinuities are arriving at the 3D printer extruder nozzle 10 mm late, a corrective action can be taken by which the next feedstock segment is made shorter to bring future discontinuities back into phase. As described previously, this offset of 10 mm may be used by the controller to adjust the lengths of all feedstock segments produced by the SEME process later, by an appropriate amount, to not only correct for the known offset but to prevent it from accumulating again. The second method however would take corrective action by altering the control code of the 3D printer to mitigate the effects the offset will have on the success of the print. This can be achieved in many ways. One example would be that the 3D printer could depart from its pre-programmed control code and perform an action to extrude and discard of the extra 10 mm of feedstock before returning to printing the part. Another alternative is that it could opt to use this material on the inside structure of the part being printed to fill in a void that would have normally been left empty. These two approaches to implementing corrective actions could also be used together, where for instance corrections to alter the feedstock production can be made to combat long term accumulating error, while corrections implemented by altering the control code could be used to correct short term errors that may fall outside of the transition tolerance if not corrected in time.

Such feedstock monitoring is not limited to the use of a scroll wheel encoder system and may alternatively be achieved using an optical sensor or other means of tracking linear motion of materials, or a combination of an encoder system and an optical sensor. The feedstock monitoring device is an improvement to the current ways of rate matching in that it tracks the true movement of the feedstock entering the 3D printer, which means that skipping errors or other potential errors do not affect the synching of the SEME module's feedstock production. This feedstock monitoring technology also allows the SEME module's controller to know if the 3D printer has started, stopped, and/or paused which enables the SEME module 102 to be used as a standalone module from the printer with no direct data connection between the printer and the SEME module.

Several further optional/alternative embodiments to the SEME technology will be discussed below including a feedstock straightening module, an extruder waste management feature, a multiple SEME output solution, a full color solution, an alternative selection/merger solution, and an alternative to splicing.

Since the SEME process involves the precise control and manipulation of the input feedstocks, an improvement has been proposed to change one or more properties of the input feedstock that may make it easier to process. This improvement, hereinafter referred to as the straightening module, consists of a solid with a constrained path similar to that of FIG. 7 that may be at an elevated temperature. When the feedstock is passed through the straightening module, any curves it may have had will be temporarily removed as it is deformed to match the straight channel. However, by raising the temperature of the channel it has been shown that the feedstock may be relaxed imparting this deformation permanently on it and thus yielding straightened feedstock.

Figure 12A:
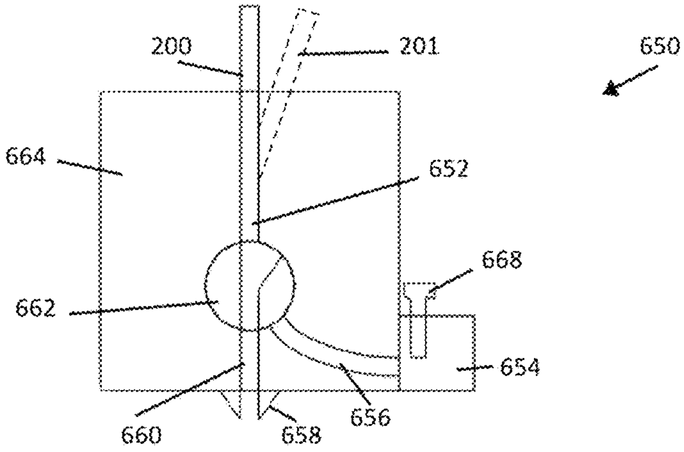
FIG. 12A shows one embodiment of an extruder system 650 which is part of printer 104 comprising a housing 664 that has a channel 652 for input feedstocks 200 or 201 and a valve 662 that can be actuated to direct this feedstock to either the channel 660 that may lead to an extrusion nozzle 658 or to another channel 656 that may lead to a waste repository 654. The waste repository 654 may contain a material property detection sensor 668 positioned to monitor entering material.

As discussed previously, after a spliced section of feedstock is extruded through a given extruder, there may be a transition region that consists of a material with a blend of properties of the spliced materials, including but not limited to mixing of colors or other physical properties. In situations where a distinct transition between materials is required and this transition volume of material is undesirable, the present disclosure provides system and method for discarding this transition material prior to leaving the extruder nozzle. In one embodiment, a valve system is included that is able to control the flow of the material from the extruder both to the output nozzle as well as to one or more waste depositories as shown in FIG. 12A, which shows an extruder valve system 650 comprising a housing 664 that has a channel 652 for input feedstocks 200 or 201 and a valve 662 that can be actuated to direct this feedstock to either the channel 660 that may lead to an extrusion nozzle 658 or to another channel 656 leading to a waste repository 654. This valve 662 may be placed anywhere along the channel 652 although it may be beneficial to minimize the distance between it and the nozzle 658 in order to reduce the volume of material that is not able to be purged through the valve into the waste repository.

In terms of the application of this improvement to fused deposition modeling 3D printing, this may allow for the process to be made faster and more efficient as the transition material will not need to be dealt with using conventional methods such as external dumping or infill dumping which one skilled in the art may recognize as solutions to dealing with undesired transition material. This disclosure also discusses the use of a material property sensor 668 which can be substantially the same as the sensor described in FIG. 3B or the like, and may be focused on feedstock as it is printed or discarded. By doing so, this sensor can provide the controller details about the material's current properties which can be another input to allow for corrective actions to be taken. For example, this sensor could be used to verify when a discontinuity passes through a certain location in the 3D printer's extrusion system to compare to that predicted by the control code, similar to how the scroll wheel can be used. The sensor may also be able to monitor transitions from one feedstock to the next in order to indicate exactly when the transition has reached sufficient threshold, in order to prevent extra transition material from potentially being wasted.

Figure 12B:
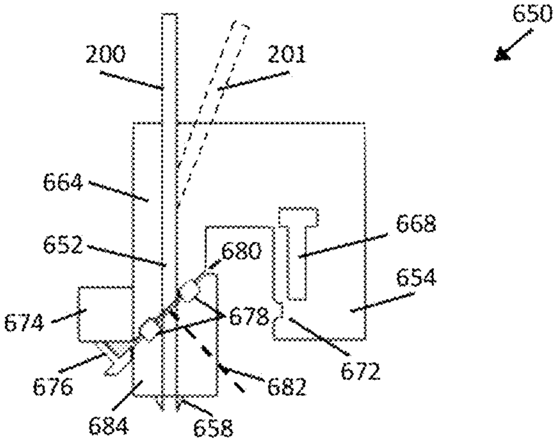
FIGS. 12B-12C illustrate an alternative embodiment of the extruder system 650 comprising an upper housing 664 that has a channel 652 for input feedstocks 200 or 201. The lower housing 684 is connected to the upper housing 664 through a pressure sealing connection 678 that allows them to rotate in the plane where they mate at 680. The actuator 674 that may be mounted to the upper housing 664 can rotate the lower housing 684 via the actuator arm 676 such that the lower housing spins about an axis 682 (illustrated as a dashed line) resulting in the extrusion nozzle 658 moving to the inlet 672 of the waste repository 654, as shown in FIG. 12C. The waste repository 654 which may be fixed to the upper housing 664 may contain a material property detection sensor 668 positioned to monitor entering material.
Figure 12C:
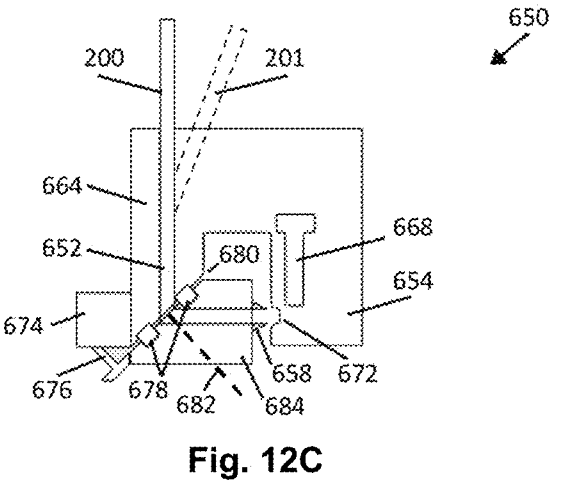

Referring to another embodiment as shown in FIG. 12B, a system similar to that of FIG. 12A is used where the extruder body may be divided into an upper housing 664 and lower housing 684. The lower housing, which includes the extruder nozzle 658, can pivot from its printing position, as shown in FIG. 12B, to a waste discarding position where the extruder nozzle 658 is positioned near a waste repository 654 as shown in FIG. 12C and labeled as position 672. The system may similarly have a material property sensor 668 used for the same benefits as described for the system of FIG. 12A. The system of FIG. 12B provides a benefit in that it allows material inside the entire extruder from entrance to nozzle to be discarded into the waste repository 654 leaving substantially no stagnant volume incapable of being purged. Further, the nozzle can pivot with a portion of the extruder, as illustrated in FIGS. 12B-12C, or can pivot with the entire extruder.

Figure 12D:
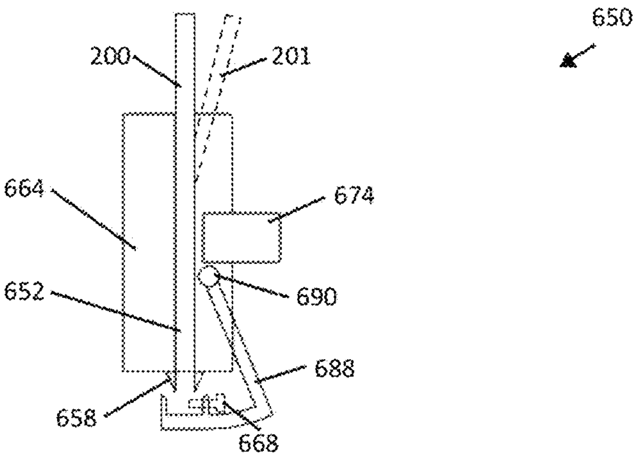
FIG. 12D illustrates another alternative embodiment of the extruder system 650 comprising a housing 664 that has a channel 652 for input feedstocks 200 or 201. The channel 652 leads to the extrusion nozzle 658. Actuator 674 can control the position of a swinging waste repository arm 688 which is attached to the housing 664 and able to rotate in the plane of the page about the point marked 690. The swinging waste repository arm 688 may contain a material property detection sensor 668 positioned to monitor entering material.

Referring to another embodiment as shown in FIG. 12D, a system similar to that of FIG. 12A is used where the entire extruder body remains fixed and a swinging waste repository arm 688 is able to move into place to allow transition material to be discarded directly into this waste repository. Depending on volume limitations within the swinging waste repository arm 688 there may be a larger waste repository into which the swinging waste repository arm 688 is able to discard accumulated waste material. The system may similarly have a material property sensor 668 used for the same benefits as described for the system of FIG. 12A. The system of FIG. 12D provides a similar benefit to that of FIG. 12B in that it allows for the purging of substantially the entire extrusion system. Furthermore, this system does not require any significant changes to be made to the core extruder and could be achieved through an addition of a swinging waste repository arm system to a standard 3D printer extruder. Although a swinging repository is shown, the repository need not be on a swing arm; it could be sliding and/or could move linearly.

In fused deposition modeling 3D printing, it is desired that the extruder nozzle only extrudes material when it is printing a part and intentionally drawing plastic layers at it is instructed to by the 3D printer's controller. There are, however, some cases where the extruder will need to extrude material for reasons other than printing. One example is when the printer is first turned on. As the extruder nozzle heats up, material inside will ooze and evacuate the chamber. When the print begins, in order to re-fill the chamber the control code will have the printer purge the nozzle by extruding a certain volume. This extrudate is waste and sometimes needs to be manually removed by a user. The extrudate can also be printed onto a sacrificial structure or discarded off the side of a build plate. In either case, this required the nozzle to move to discard the material, which takes time.

To begin a 3D print, a 3D printer will often prime its nozzle. It does so by performing a pre-programmed sequence. This typically entails traveling to a waste repository and extruding a volume of material, and may further entail wiping the nozzle on a brush, before starting the print. This is commonly done at the start of a print but may occur at any time during a print. For a dual extruder printer, the printer often alternates between two nozzles to print a part with two feedstocks. When one extruder is being used, the other one is in an idle position and typically needs to be primed/purged before being used again. Any of the feedstock diverters described herein may be used for priming and/or purging an extruder when using any type of feedstock.

When a nozzle is used for multicomponent feedstock printing, there may exist a transition region between two dissimilar feedstocks leading to a transition volume of material that may need to be discarded as discussed herein. If there are 1000 changes of feedstock, there can be 1000 transition regions to discard, which takes time.

The utility of the feedstock diverter system is to allow this transition material to be discarded more quickly and efficiently. In the examples shown in FIGS. 12A-12D (e.g., valve, pivoting nozzle, and swinging arm), the extruder is able to discard transition material to a local waste depository rather than having to move to a sacrificial waste print or a waste repository off of the build plate. Saving this time and mitigating the need for the hot end of the extruder to travel away from the part can lead to quicker and higher quality printing results.

Although in many applications the feedstock transition material is undesirable, utility has been found for it in that the formation of arbitrary combinations of materials may be formed. In a process called rapid material modulation (hereinafter abbreviated to RMM) the segments of material being spliced together in the SEME process may be reduced to a size small enough to allow for a material to be extruded with approximately continuous properties. For an example where blue NYLON material and yellow NYLON material are being spliced together, the sections may be made small enough to produce an extruded material of purely transition material that may have a uniform color different from both the input feedstocks. The same principle may be applied to combining the mechanical properties, the electrical conductivity properties, or any other properties of the input materials. To ensure consistent mixing occurs during the extrusion process a static or active mixing solution (e.g., a mixing mechanism) may be incorporated into the extrusion system.

The SEME module 102 has, by way of example, been described above as a system which accepts multiple inputs and has one output, but it is to be noted that the technology is not limited to having one output. The SEME technology may have any number of outputs that can be used with various extruders that may be operating in parallel. This may be desirable for cases where different classes of materials are being processed which require different types of extrusion technology.

The input drive module 154 and merger module 156 solution discussed previously when used with the cutter module 160 provides an effective method for converting a parallel feed into a serial feed although it is limiting in the fact that each input feed requires a dedicated drive module. In an alternative embodiment called the sliding selection system (hereinafter abbreviated to SSS) an electromechanical system including two actuators is able to control any number of input feedstocks. In this system, one linear actuator controls the position of a trolley that houses any number of feedstock drive units and is able to position any given feedstock in line with the input to the cutter module as shown in FIGS. 13A-13B.

Figure 13A:
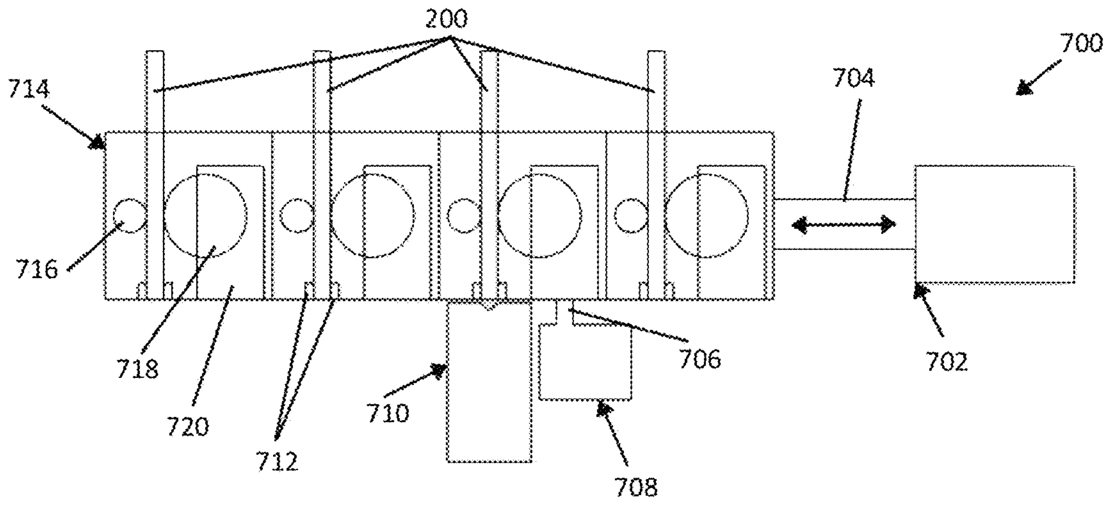
FIG. 13A shows an example of a sliding selection system 700 (which provides a way of incorporating all drives 154) comprising one or more feedstock drive actuators 714 which include an idler wheel 716, a drive wheel 718, a drive wheel transmission 720, and feedstock restraints 712. Linear actuator 702 (a first motor) controls the position of the drive actuator(s) 714 relative to cutter module 710 via actuation arm 704. Each drive mechanism may actuate a different input feedstock 200. A second motor 708 may actuate the drive wheel transmission 720 when it is in line with second motor shaft 706. This second motor 708 may be stationary with respect to the cutter module 710.
Figure 13B:
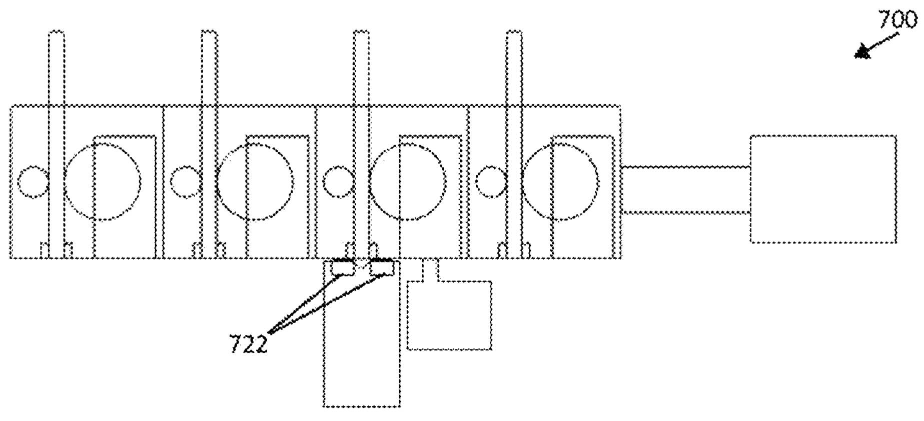
FIG. 13B shows the example sliding selection system 700 of FIG. 13A with the addition of cutting surface(s) 722.

FIG. 13A shows an example of a sliding selection system 700 comprising one or more feedstock drive actuators 714 that each include an idler wheel 716, a drive wheel 718, a drive wheel transmission 720, and feedstock restraints 712. Linear actuator 702 (a first motor) controls the position of the drive actuator(s) 714 relative to cutter module 710 via actuation arm 704. Each drive mechanism may actuate a different input feedstock 200. A second motor 708 may actuate the drive wheel transmission 720 when it is in line with second motor shaft 706. It should be noted therefore that the sliding selection system obviates the need for third, fourth, etc. motors because all drive actuators 714 use the same motor 708 instead of using respective motors.

The feedstock detector modules 152 may be integrated within each drive unit module 154 and/or before the cutter module 160 as they were in the earlier described SEME setup. In an alternative embodiment, the sliding trolley or any adjacent member may be equipped with a cutting surface that is able to part the feedstock by movement of the linear actuator as shown in FIG. 13B, which shows the example sliding selection system 700 of FIG. 13A with the addition of cutting surface(s) 722. When the linear actuator 702 moves the feedstock from one input to another, the feedstock currently being driven may be parted off by the cutting surface, effectively eliminating the need for a separate cutting module. This is an improvement as it simplifies the system and makes the SEME process faster and more efficient.

The SEME process does not require the adjacent segments of feedstock to be spliced together and it has been shown that it can be used in certain situations without such splicing taking place, as for example illustrated in FIG. 2B. The SEME process may use one or more drive modules at the SEME module 102 to "push" the multicomponent feedstock to the 3D printer. The feedstock can be pushed through a constrained pathway (e.g., a tube) in a 'Bowden'-type system, as described below. In order to utilize unspliced segments of feedstock for fused deposition modeling 3D printing however, it may be required that the segments of feedstock be forced towards the 3D printer extruder at the same rate with which the 3D printer extruder consumes the feedstock. It is known that these un-spliced segments may cause extrusion jams unless there is a force along the axis of the feedstock pressing it into the extruder and maintaining pressure between them at each discontinuity.

To address this issue, the present method and system provides an expandable constrained passageway that has elastic properties. An implementation of this solution is shown in FIG. 14A. More particularly, FIG. 14A shows one or more spool(s) of feedstock 200 and 201 passing into SEME module 756. The multicomponent feedstock output of the SEME module 756 passes into the 3D printer 104 via expandable constrained passageway 750. An example implementation of the expandable constrained passageway 750 includes two constrained buffer tubes 752 connected by a coupler 754 that may have elastic properties. In an alternative embodiment, the mechanism may be simplified to comprise a single constrained buffer tube that has sufficient elastomeric properties built into the material to achieve a similar benefit to that described for the setup in FIG. 14A.

The expandable constrained passageway 750 is able to accommodate expansion and thus can create a buffer for situations where the SEME module 756 may produce feedstock at a rate faster than the 3D printer 104 can consume it. This extra feedstock length inside the constrained buffer tube(s) 752 will cause the clastic members in it to expand and impose an equal and opposite force pressing the feedstock segments together. This is an advantage over an ordinary passageway that does not have sufficient elastomeric properties built in as it not only creates a buffer for a potential mismatch in SEME and extruder production and consumption rates respectively, but it also causes the segments to be forced together which can act to reduce the likelihood of jamming in the 3D printer extruder.

In an alternative embodiment, the 3D printer may not actively pull in feedstock and thus it would be the responsibility of the SEME process to push feedstock through the 3D printer's hot end which one skilled in the art may refer to as a 'Bowden' extrusion system. In this case, a buffer would not be required and thus the constrained passageway 752 should not be able to stretch a substantial amount in order to allow for accurate extrusion control from the hot end. All of the systems and concepts discussed above for use with the standard extrusion system that pulls feedstock may also be employed with the Bowden style system including but not limited to the use of a scroll wheel to determine corrective actions, or the use of an extrusion valve system.

The merger module disclosed herein is a system that provides for several different feedstocks, which optionally may be aligned parallel to each other, to each be deflected to a single path. The merger can be considered a parallel-to-series converter. One way to illustrate the value of the merger is through two examples. The first example relates to the merger's use in SEME technology, as for example described with reference to FIG. 2A. Before the merger, each feedstock is processed by its own input drive and sensor. Following the merger, however, there is only one path and thus only one cutter is needed to cut all input feedstock. This saves complexity, cost, and physical space. The merger provides a way of selectively passing any of the various feedstock feeds into the output stream which is useful in aligning different segments of feedstock end to end. While a system such as the sliding selection system of FIGS. 13A and 13B may be used in place of a merger, the merger is simpler in construction and lower cost for a small number of inputs. However, there may be a practical limit as to how many feeds the merger can accept. For a large number of feedstock inputs, the sliding selection system may become more economical on a per input basis.

The second example is the use of a merger in a simplified use case to load feedstock, where the merger module has the ability to load one of 'n' number of feedstocks into the 3D printer. Such a system will not need to splice feedstocks together or rapidly modulate the feedstock throughout a print like SEME. The system can use the merger to simply deliver the right feedstock at the start of the print. This is very useful when considering the case of continuous printing on a 3D printer without human intervention. The printer may have a queue of parts to print over a given 24 hour period and the parts may not all be printed in the same feedstock. If a printer is equipped with a feedstock swapping technology, the printer could use the merger to unload the current feedstock, and load the desired feedstock into the printer's extruder during the time between when one print ends and the next one begins. This 'CD changer' concept of feedstock swapping can be provided by a simplified version of a SEME module that includes input drive modules and a merger. The system may include more modules, such as sensory devices, and may use the concept of 'feedstock homing' described elsewhere herein. For a Bowden set-up, an outgoing drive module is needed.

Figure 15:
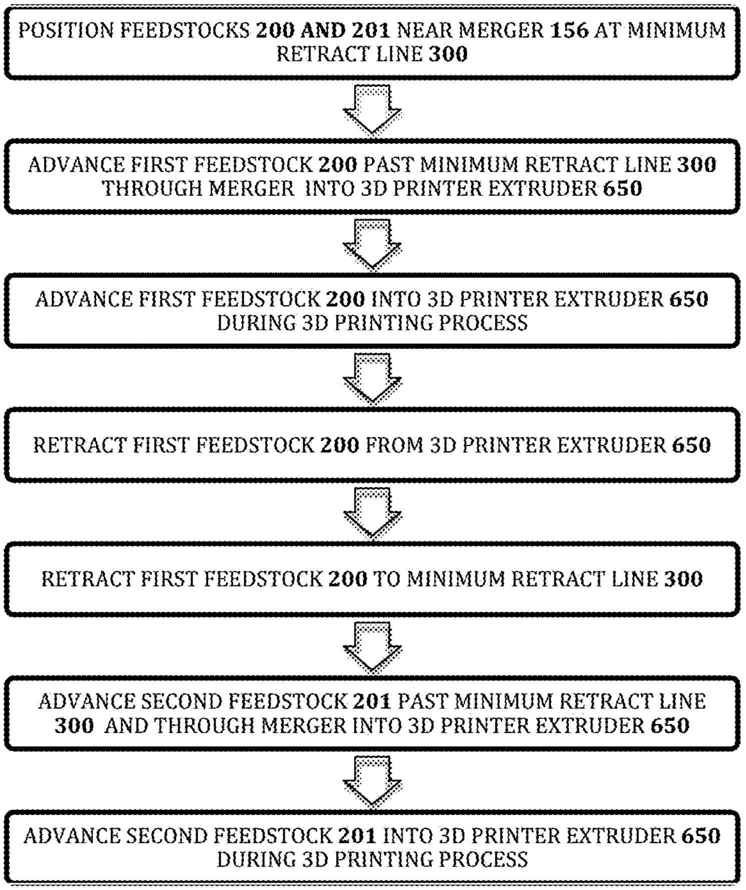
FIG. 15 is a flow chart illustrating an example method for loading feedstock into a 3D printer.

FIG. 15 is a flow chart illustrating an example method for loading feedstock into a 3D printer using a merger module 156, which may be substantially similar to merger module 156 of FIG. 5A. The flow chart provides an example of how a merger can be used in an automated feedstock loading system. Note that rather than the cutting the feedstock, the feedstock is simply pulled out of the 3D printer when printing is done. Thus, this embodiment does not require a splicer, cutter or FQMM. Unless it is a Bowden set-up, an outgoing drive is optional but not required.

As illustrated in FIG. 15, a method of automatically loading feedstock into an extruder of a 3D printer begins by positioning the first feedstock 200 and the second feedstock 201 near the merger 156. The feedstock can be positioned at or proximal to a minimum retract line 300. To load the first feedstock 200, the method includes advancing the first feedstock past the minimum retract line and through the merger 156 into an extruder 650 of a 3D printer, advancing the first feedstock into the extruder during a 3D printing process, retracting the first feedstock from the extruder, and retracting the first feedstock through the merger and to the minimum retract line. To load the second feedstock 201, the method continues by advancing the second feedstock past the minimum retract line and through the merger into the extruder, and advancing the second feedstock into the extruder during the 3D printing process.

Figure 16:
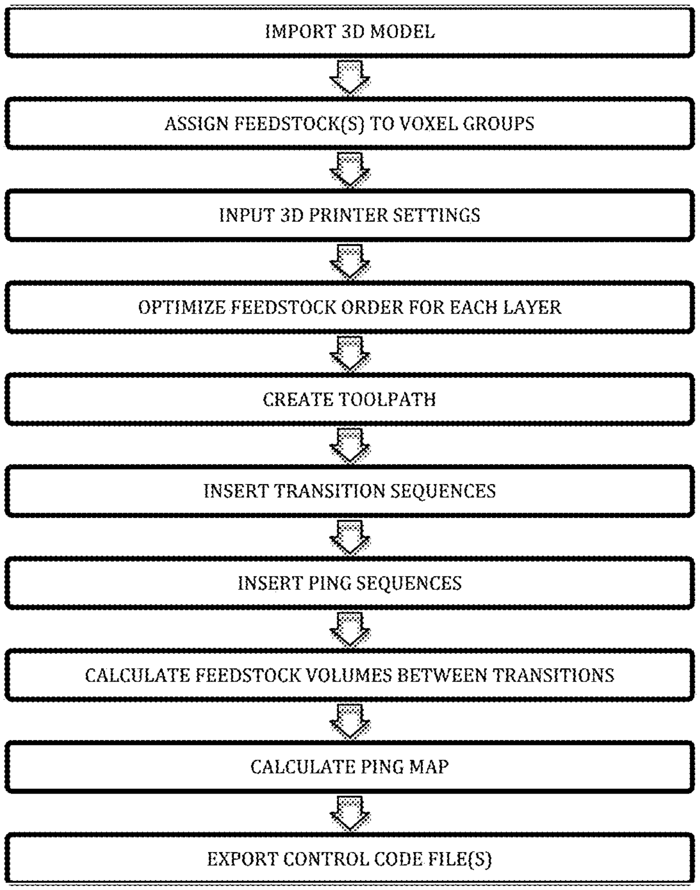
FIG. 16 is a flow chart illustrating an example process for preparing control code to print a 3D model using multicomponent feedstock.

FIG. 16 is a flow chart illustrating an example process for preparing control code to print a 3D model using multicomponent feedstock. The process begins by importing a 3D model. The process continues by assigning feedstock(s) to voxel groups, inputting 3D printer settings, and optimizing feedstock order for each layer. Optimizing feedstock order for each layer may include reducing the number of feedstock changes by consolidating the printing of a given feedstock between adjacent layers. For example, if each layer has red and blue, instead of printing red and blue on layer one and then red and blue on layer two in that order, the printer can print red on layer one and then blue on layer one and then blue on layer two followed by red on layer two. The process continues by creating a tool path and inserting a transition sequence. A transition sequence can include a set of instructions that allows the printer to discard transition feedstock.

This may include discarding transition material off of the build plate, into a waste receptacle, to deposit transition material inside the part being printed, e.g., to form a support structure, and/or to deposit transition material to form a structure on the print bed. Transition material can be discarded, for example, using any of the devices and methods described with references to FIGS. 12A-12D. The process also includes inserting ping sequences, calculating feedstock volumes between transitions, and calculating a ping map. The process ends by exporting control code file(s). The control code files may include, but are not limited to, 3D printer control code, feedstock changing information for the SEME module (e.g., information to assemble the multicomponent feedstock), a ping map, and a header file with information for the SEME module and the 3D printer.

Although the SEME system described herein has a particular advantage in printing parts comprising different (new) materials, the same system can be used to produce multicomponent feedstock that is used in successive printed parts. In the description, emphasis has been placed on describing the SEME module as a technology that provides for feedstock to be changed during a print, to permit the printing of a part that comprises multiple feedstocks. The SEME module can also be used to switch feedstock between two or more prints. In continuous printing, for example, two or more parts are printed in succession. The SEME controller can be loaded with a queue of prints and when the SEME module finishes producing feedstock for a first print, it can align and abut (and optionally splice) the feedstock required for the next print to the end of that from the first print so that the feedstock arrives at the print head for the start of the next print. This use of the SEME module offers a benefit to the user because it allows a 3D printer to finish one print and start the next using a different feedstock without manual intervention. The printed parts can be automatically removed from the printer between prints using known methods. For example, parts may be removed using an automated build plate changer, a robotic clearing arm, or the like. Alternatively, the printed parts need not be removed from the build plate between prints. Instead, the printer can print consecutive objects beside each other.

EXEMPLIFICATION

Example 1: Flashlight Print

Figure 17A:
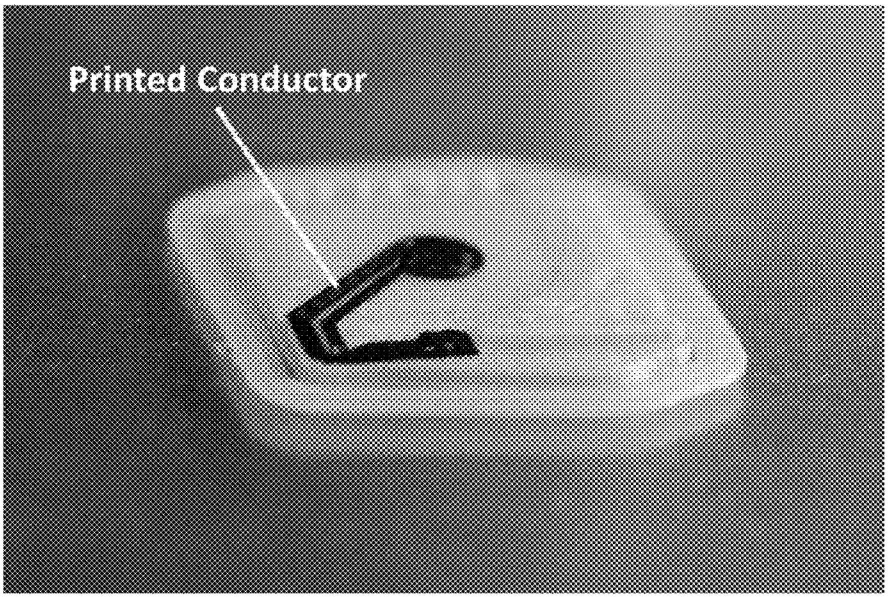
FIG. 17A is a photograph illustrating an example printed part, i.e., the lower portion of a body of an LED flashlight, 3D printed using SEME technology.
Figure 17B:
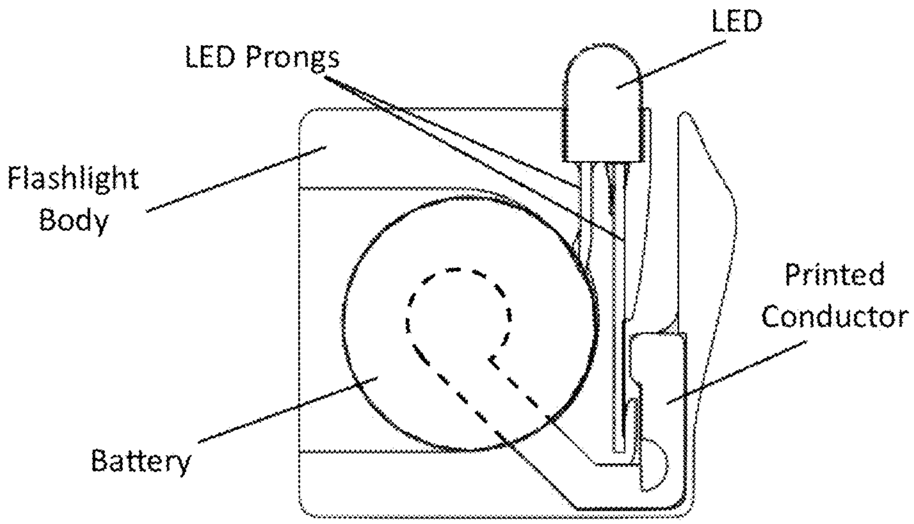
FIG. 17B schematically illustrates the LED flashlight including the complete 3D printed flashlight body of which the lower portion is shown in FIG. 17A, a battery and an LED.

Using SEME technology a unibody branded flashlight was 3D printed with a single extruder, unmodified commercially available 3D printer. For this print, three feedstocks were used. The first was an electrically conductive material while the others were white and purple polylactic acid (PLA). FIG. 17A shows the lower portion of the body of the flashlight during a stage in the printing process, illustrating the conductive material. FIG. 17B illustrates components of the example 3D printed flashlight. The flashlight body had a slot in it for a small watch battery as well as 2 channels for the prongs of a light emitting diode (LED). One prong of the LED was deflected into contact with the positive terminal of the battery. A conducting path was printed into the flashlight body that connected the negative terminal of the battery towards the second prong of the LED. A small gap was left between this conductive path and the LED prong to ensure that the circuit was not closed in the as printed state. When the side of the flashlight was pressed inwards with sufficient force, the conductive path made contact with the LED prong completing the circuit and turning on the flashlight. When this force was released, the elasticity of the flashlight body caused the conductor to return to its initial position opening the circuit up again. The top of the flashlight had a white logo embedded in the purple face in order to drive the economic value of the part through custom branding.

To fabricate the flashlight, the 3D printer followed a list of pre-calculated tool paths while the SEME module fabricated a multicomponent feedstock for the printer. The two devices were synchronized such that the right build material arrived at the extruder's nozzle at the right time. For instance, in some layers there existed both the purple PLA and conductive material. The 3D printer first completed the purple PLA portion of the given layer and then moved over to perform a material transition. Feedstock was extruded off the side of the 3D printer's build plate for a sufficient amount of time to allow the purple PLA to evacuate the extruder and be replaced by conductive material. The extruder then returned to the part and printed the conductive portion of the layer. The same process took place on the top layers between purple and white PLA.

In order for the flashlight circuit to be printed, there needed to be a conductive path as well as an insulating body. To operate well, it was important that the conductive path had sufficient conductivity and that there were no short circuits. These requirements are very difficult to meet on standard single extruder 3D printers. Most 3D printers can only print with one build material in a print and, thus, they are not able to have insulating and conducting features required to print this embedded circuit. Printers that do have two extruders may be able to print with two feedstocks but the quality of the print may be diminished. It is known that while the insulator feedstock is printing, the conductive feedstock may ooze out of its respective extruder causing for conductive contamination across the printed layer or vice versa. This can lead to short circuits that will compromise the quality of the print. Using SEME technology with a single extruder printer, the printer was able to use multicomponent feedstock, formed from serially aligned multiple feedstocks, and print at superior quality. The use of only a single nozzle eliminated the opportunity for oozing, resulting in a high quality multicomponent print.

When the print was complete, some support material was removed, and the battery and LED were pressed into place by hand. Using SEME technology, the entire flashlight body was printed on a single extruder 3D printer in a process that required no manual intervention. The 3D printer used is available on the market as a single feedstock printer along with hundreds of other similar ones from other manufacturers. The 3D printer used for this print was a WANHAO 4S, which is a two extruder printer, but only one of the extruders was used. SEME technology has also been used with such commercially available printers as the PRINTRBOT Simple Metal, SEEMECNC® Orion, MAKERBOT® Replicator 2, and MAKERGEAR M2, to name a few. With the addition of the SEME module, the printer was upgraded to a multi-color and multi-material printer. As SEME technology leverages the single extruder already in the printer, no modifications were required.

Example 2: Magnetic Nametag

Using SEME technology a functional magnetic nametag was 3D printed. For this print, three feedstocks were used. The first was bronze powder infused material, the second was ferromagnetic material, and the third was white PLA. The front face of the nametag was made from bronze infused material with white PLA text embedded in it. The back of the nametag had a region of ferromagnetic material.

To fabricate the nametag, the 3D printer followed a list of pre-calculated tool paths while the SEME module fabricated a multicomponent feedstock for the printer. The two devices were synchronized such that the right build material arrived at the extruder's nozzle at the right time. For instance, in some layers there existed both the white PLA and bronze infused material. The 3D printer first completed the white PLA portion of the given layer and then moved over to perform a material transition. The printer created a structure directly beside the nametag on the build plate using the volume of transition material required for the white PLA to evacuate the extruder and be replaced by the bronze infused material. The extruder then went back to the part and printed the bronze infused portion of the layer. The same process took place on the top layers between the bronze infused material and the ferromagnetic material. The control code for the 3D printer was written to reduce the number of feedstock transitions that needed to occur. This was done by printing the same feedstock on adjacent layers one after another rather than by transitioning to another material and then returning to the initial feedstock for the next layer. For instance, instead of continuously switching between bronze infused material and white PLA on each layer, white PLA was first printed and then the bronze infused material was used to print on the first layer and then the second layer. The material was then switched to white PLA which completed its portion of the second layer as well as the third layer.

When the print was completed, the surfaces of bronze infused material were buffed to create a metallic look. The printed nametag looked and felt like a standard metallic nametag and was able to adhere to clothing using an external magnet. As discussed, the limitation of only using one material on standard single-extruder 3D printers would typically prohibit a composite magnetic nametag such as this from being printed in an automated process. Advantageously, using the SEME technology with a single-extruder printer achieved a clean definition between adjacent materials, a feature that is difficult to achieve using a multi-extruder printer due to the oozing of material as previously described.

Example 3: Pinging Process

A tall striped vertical cylinder was 3D printed using SEME technology, taking over 10 hours to complete. In order to account for variability in the 3D printer's extrusion over this length of time, processes of pinging and corrective action were implemented. The SEME module was connected to the 3D printer through an expandable constrained buffer tube. A scroll wheel was also used to measure feedstock consumption of the printer's extruder. The distance between the scroll wheel and the tip of the extruder nozzle was known to be 631 mm.

To begin the print, the SEME module began fabricating the multicomponent feedstock according to the volumes of each feedstock required to make each layer of the striped vertical cylinder. The segments of feedstock were each about 250 mm long in this print and alternated from white PLA to black PLA. As soon as the feedstock passed through the scroll wheel device, the device was able to begin measuring how far the feedstock had gone into the printer. The user loaded feedstock into the printer's extruder and passed it down to the nozzle. When the user had sufficiently loaded the feedstock into the extruder, the user pressed a button to start the print on the SEME module. The start of the print acted as the first 'ping'. Based on data from the scroll wheel, the SEME module knew the actual length the feedstock had gone into the extruder as well as the ideal length it should have gone based on the known distance of 631 mm. By comparing the two lengths, the SEME module was able to take corrective action to ensure it restored calibration for the rest of the print.

As the print continued, a ping sequence was executed after approximately every 1000 mm of feedstock was consumed. The ping sequences had been inserted into the print control code. Since the SEME module did not have a direct data connection to the 3D printer's controller, the scroll wheel was used to allow the printer to signal a ping to the SEME module. To send a ping, the 3D printer's extruder stopped extruding feedstock for 10 seconds, then extruded for 5 seconds and then paused for another 10 seconds. The controller of the SEME module was able to register this low-high-low signature and registered a ping. It then indexed down the list of pings it expected to see based on the 3D printer's control code. In the case where a ping is inserted every 1000 mm it expects to see a ping at 1000 mm, 2000 mm, 3000 mm, and so on. At each ping, a controller of the SEME module compares the theoretically perfect ping reference value to the measured scroll wheel value. If, for instance, the first ping was to occur at 1000 mm into the print but instead was registered at 990 mm, the SEME module's controller identifies that the 3D printer is under-extruding by 1%. If this discrepancy is not corrected, each discontinuity in the feedstock may arrive at the extruder nozzle 10 mm late for the rest of the print. To avoid this, the SEME module, in one example of a corrective action, may remove 10 mm from the next segment of feedstock being created in order to shift back into calibration.

A similar print was conducted where pinging was used to maintain long term calibration. In this case, the SEME controller was connected directly to the 3D printer's controller through a wired connection. Since the feedback loop was direct, the data was sampled every 5 seconds and the theoretical feedstock consumption was compared to that measured by the scroll wheel. Appropriate corrective action was then able to be taken to allow for constant fine tuning of calibration.

Example 4: Continuous Printing

A SEME module has been used to automate the process of feedstock loading and swapping on a 3D printer to allow continuous production. For example, a series of five 2-hour 3D prints are set up in a queue such that they will print one after another on a single 3D printer. Between each print, sufficient time is left for the prior print to be moved off the build plate, optionally by a robotic actuator. Along with each file to be printed in the queue is the desired build material for that print. When the first print is completed, the SEME module's controller analyzes the next print in line in order to determine if the build material is the same or needs to be changed. If it needs to be changed, the SEME module cuts the current feedstock and splices the new feedstock to it such that the new feedstock arrives at the extruder nozzle just as the first print is finished. In another case where a print required more build material than could fit on one spool, the SEME module was used to splice the end of a new unit of the same feedstock to the tail end of the initial feedstock. In another case, when the feedstock needed to be swapped, the current feedstock was pulled out of the 3D printer's extruder and retracted all the way back behind the minimum retract line of the merger module. The next feedstock was then driven all the way through the merger and constrained path into the 3D printer's extruder. This process was similarly able to automate the loading of new feedstocks into the printer.

Example 5: SEME Start Up Procedure

For the SEME module to initialize, it is useful to clear out the system. The first step is to actuate the cutter into a cut position to cut any feedstock that may be present. Next, the outgoing drive module runs for a sufficient length of time to remove any feedstock that may have been present in the portion of the system past the cutter module. Next, each of the input drive modules runs to retract feedstock at least the distance from the cutter to the minimum retract line to remove any feedstocks present in the merger. Next, a first feedstock is driven into the merger and past it to the feedstock homing sensor. When the sensor detects the feedstock, the controller identifies this as the end of that feedstock. The controller then retracts this feedstock to the minimum retract line using a drive module. This homing procedure is repeated for each of the feedstocks.

The foregoing description of preferred embodiments of the disclosure has been presented to illustrate the principles of the disclosure and not to limit the disclosure to the particular embodiment illustrated.

While this invention has been particularly shown and described with references to example embodiments thereof, it will be understood by those skilled in the art that various changes in form and details may be made therein without departing from the scope of the invention encompassed by the appended claims.

What is claimed is:

1. An apparatus for buffering feedstock fed into a 3D printer, the apparatus comprising:
- a 3D printer having a print head;
- a feedstock source having a feedstock output driver;
- a feedstock buffer including an expandable constrained passageway through which the feedstock is fed from the output driver to the print head of the 3D printer; and
- a feedstock monitoring device positioned between the output driver and the print head to track a size of the feedstock buffer, which is indicative of the feedstock amount.

2. The apparatus according to claim 1, wherein the feedstock source is a multicomponent feedstock source.

3. The apparatus according to claim 1, wherein the expandable constrained passageway comprises at least two tubes in series and connected by at least one coupler that has elastic properties.

4. The apparatus according to claim 1, wherein the expandable constrained passageway comprises a telescoping mechanism including at least two telescoping tubes.

5. The apparatus according to claim 1, wherein the feedstock monitoring device is configured to track movement of the feedstock.

6. The apparatus according to claim 1, wherein the size of the feedstock buffer is tracked using a linear encoder, a rotary encoder, an optical sensor, a non-contact sensor including an emitter and a detector, or a mechanical switch.

7. The apparatus according to claim 1, wherein the feedstock monitoring device is configured to pass feedstock consumption information to the feedstock source so that the feedstock source can replenish the buffer to keep it in a neutral state.

8. The apparatus according to claim 4, wherein the feedstock buffer comprises a spring that can limit range of motion of the telescoping mechanism.

9. The apparatus according to claim 4, wherein the feedstock buffer comprises one or more physical stops that can limit range of motion of the telescoping mechanism.

10. The apparatus according to claim 1, wherein the feedstock is spooled feedstock in the form of filament.

11. The apparatus according to claim 1, wherein the feedstock is multicomponent feedstock.

12. The apparatus according to claim 1, further comprising a cutting module along a feedstock path.

13. The apparatus according to claim 1, wherein the feedstock buffer is between the output driver and the print head.

14. An apparatus for buffering feedstock fed into a 3D printer, the apparatus comprising:
- a 3D printer having a print head;
- a feedstock source having a feedstock output driver; and
- a feedstock buffer including an expandable constrained passageway through which the feedstock is fed from the output driver to the print head of the 3D printer, wherein the expandable constrained passageway comprises a telescoping mechanism including at least two telescoping tubes, and wherein the feedstock buffer comprises one or more physical stops that can limit range of motion of the telescoping mechanism.

15. The apparatus according to claim 14, wherein the feedstock source is a multicomponent feedstock source.

16. The apparatus according to claim 14, further comprising a feedstock monitoring device positioned between the output driver and the print head to track movement of the feedstock.

17. The apparatus according to claim 14, further comprising a feedstock monitoring device positioned between the output driver and the print head to track a size of the feedstock buffer, which is indicative of the feedstock amount.

18. The apparatus according to claim 17, wherein the size of the feedstock buffer is tracked using a linear encoder, a rotary encoder, an optical sensor, a non-contact sensor including an emitter and a detector, or a mechanical switch.

19. The apparatus according to claim 17, wherein the feedstock monitoring device is configured to pass feedstock consumption information to the feedstock source so that the feedstock source can replenish the buffer to keep it in a neutral state.

20. The apparatus according to claim 14, wherein the feedstock buffer comprises a spring that can limit the range of motion of the telescoping mechanism.

21. The apparatus according to claim 14, wherein the feedstock is spooled feedstock in the form of filament.

22. The apparatus according to claim 14, wherein the feedstock is multicomponent feedstock.

23. The apparatus according to claim 14, further comprising a cutting module along a feedstock path.

24. The apparatus according to claim 14, wherein the feedstock buffer is between the output driver and the print head.

25. An apparatus for buffering feedstock fed into a 3D printer, the apparatus comprising:
- a 3D printer having a print head;
- a feedstock source having a feedstock output driver; and
- a feedstock buffer including an expandable constrained passageway through which the feedstock is fed from the output driver to the print head of the 3D printer, wherein the expandable constrained passageway comprises a telescoping mechanism including at least two telescoping tubes, and wherein the feedstock buffer comprises a spring that can limit range of motion of the telescoping mechanism.

* * * * *